US012388503B2

(12) United States Patent
Haghighat et al.

(10) Patent No.: US 12,388,503 B2
(45) Date of Patent: Aug. 12, 2025

(54) UL MIMO FULL TX POWER

(71) Applicant: InterDigital Patent Holdings, Inc., Wilmington, DE (US)

(72) Inventors: Afshin Haghighat, Ile-Bizard (CA); Virgil Comsa, Montreal, CA (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/429,520

(22) PCT Filed: Feb. 11, 2020

(86) PCT No.: PCT/US2020/017636
§ 371 (c)(1),
(2) Date: Aug. 9, 2021

(87) PCT Pub. No.: WO2020/167747
PCT Pub. Date: Aug. 20, 2020

(65) Prior Publication Data
US 2022/0109474 A1 Apr. 7, 2022

Related U.S. Application Data

(60) Provisional application No. 62/932,074, filed on Nov. 7, 2019, provisional application No. 62/910,085, filed
(Continued)

(51) Int. Cl.
*H04B 7/0456* (2017.01)
(52) U.S. Cl.
CPC ................... *H04B 7/0465* (2013.01)

(58) Field of Classification Search
CPC .... H04B 7/0465; H04B 7/0626; H04B 7/063; H04B 7/0426; H04B 7/0639; H04B 7/0481; H04W 52/146; H04W 52/42; H04W 8/24
See application file for complete search history.

(56) References Cited

U.S. PATENT DOCUMENTS 8,478,190 B2 * 7/2013 Sayana ................. H04L 5/0091
455/7
8,687,601 B2 * 4/2014 Xu ........................ H04B 7/0628
370/373
(Continued)

FOREIGN PATENT DOCUMENTS

AU 2015210884 A1 * 8/2016 .......... H04W 52/146
CA 2766648 A1 * 1/2011
(Continued)

OTHER PUBLICATIONS

3rd Generation Partnership Project (3GPP), R1-1900810, "On Solutions for UL Full TX Power", InterDigital Inc., 3GPP TSG RAN WG1 Ad-Hoc Meeting 1901, Taipei, Taiwan, Jan. 21-25, 2019, 4 pages.
(Continued)

*Primary Examiner* — Berhanu Tadese
(74) *Attorney, Agent, or Firm* — Condo Roccia Koptiw LLP

(57) ABSTRACT

A WTRU may be configured to transmit to a network (e.g., in a first indication) a full power uplink transmission capability associated with the WTRU, e.g., Cap3. The WTRU may receive (e.g., in a second indication) an indication of whether the WTRU is allowed to operate with full power transmission. The WTRU may determine (e.g., from a set of TPMIs), a subset of TPMIs based on, for example, the WTRU's full power uplink transmission capability (e.g., where the subset of TPMIs includes a first TPMI). The set
(Continued)

of TPMIs may comprise one or more subsets of TPMIs. The WTRU may transmit (e.g., in a third indication) an indication of the determined subset of TPMIs. The WTRU may receive (e.g., in a fourth indication) an indication of the first TPMI in the subset of TPMIs. The WTRU may transmit to the network uplink data precoded with the first TPMI.

14 Claims, 12 Drawing Sheets

Related U.S. Application Data on Oct. 3, 2019, provisional application No. 62/886,625, filed on Aug. 14, 2019, provisional application No. 62/840,685, filed on Apr. 30, 2019, provisional application No. 62/824,579, filed on Mar. 27, 2019, provisional application No. 62/804,897, filed on Feb. 13, 2019.

(56) References Cited

U.S. PATENT DOCUMENTS

| | | | | |
|---|---|---|---|---|
| 8,982,801 | B2* | 3/2015 | Shin | H04W 72/0473 370/341 |
| 9,491,717 | B2* | 11/2016 | Kim | H04W 52/283 |
| 9,603,099 | B2* | 3/2017 | Shin | H04W 52/365 |
| 9,763,199 | B2* | 9/2017 | Pelletier | H04W 52/365 |
| 9,781,738 | B2* | 10/2017 | Pietraski | H04L 5/0053 |
| 9,876,620 | B2* | 1/2018 | Nam | H04L 5/001 |
| 10,003,486 | B2* | 6/2018 | Zhu | H04W 52/241 |
| 10,601,485 | B2* | 3/2020 | Park | H04B 7/0639 |
| 10,623,224 | B2* | 4/2020 | Nammi | H04L 1/0003 |
| 10,708,088 | B2* | 7/2020 | Park | H04W 72/04 |
| 10,735,072 | B2* | 8/2020 | Kwak | H04B 7/0626 |
| 10,749,584 | B2* | 8/2020 | Rahman | H04W 72/23 |
| 10,863,497 | B2* | 12/2020 | Haghighat | H04B 7/0456 |
| 10,917,150 | B2* | 2/2021 | Lee | H04L 25/03343 |
| 10,924,240 | B2* | 2/2021 | Sridharan | H04B 7/0689 |
| 10,944,462 | B2* | 3/2021 | Li | H04B 7/0456 |
| 11,012,129 | B2* | 5/2021 | Petersson | H04B 7/0619 |
| 11,044,120 | B2* | 6/2021 | Davydov | H04B 7/0617 |
| 11,095,348 | B2* | 8/2021 | Park | H04B 7/0639 |
| 11,101,856 | B2* | 8/2021 | Park | H04B 7/0639 |
| 11,139,864 | B2* | 10/2021 | Petersson | H04B 7/0404 |
| 11,159,221 | B2* | 10/2021 | Manolakos | H04B 7/0691 |
| 11,184,865 | B2* | 11/2021 | Rahman | H04W 52/146 |
| 11,191,033 | B2* | 11/2021 | Sridharan | H04W 52/346 |
| 11,277,188 | B2* | 3/2022 | Ren | H04B 7/0691 |
| 11,317,361 | B2* | 4/2022 | Noh | H04W 52/42 |
| 11,342,972 | B2* | 5/2022 | Huang | H04B 7/0621 |
| 11,343,043 | B2* | 5/2022 | Kwak | H04L 5/0051 |
| 11,368,916 | B2* | 6/2022 | Park | H04B 7/0456 |
| 11,418,240 | B2* | 8/2022 | Harrison | H04B 7/0868 |
| 11,451,282 | B2* | 9/2022 | Park | H04B 7/088 |
| 11,515,909 | B2 | 11/2022 | Park et al. | |
| 11,516,745 | B2* | 11/2022 | Huang | H04W 52/367 |
| 11,553,440 | B2* | 1/2023 | Zhang | H04B 7/0639 |
| 11,638,219 | B2* | 4/2023 | Park | H04B 7/088 370/329 |
| 11,653,311 | B2* | 5/2023 | Sun | H04B 7/0628 370/329 |
| 11,799,533 | B2* | 10/2023 | Zhang | H04B 7/0628 |
| 11,855,923 | B2* | 12/2023 | Kwak | H04L 27/26025 |
| 11,876,586 | B2* | 1/2024 | Yao | H04W 52/42 |
| 11,937,191 | B2* | 3/2024 | Liu | H04W 8/24 |
| 11,973,557 | B2* | 4/2024 | Park | H04W 24/10 |
| 2008/0080634 | A1 | 4/2008 | Kotecha et al. | |
| 2011/0019776 | A1* | 1/2011 | Zhang | H04L 5/0023 375/340 |
| 2016/0192350 | A1* | 6/2016 | Yi | H04L 5/0035 370/329 |
| 2017/0251438 | A1* | 8/2017 | Shin | H04W 72/21 |
| 2017/0318543 | A1* | 11/2017 | Nam | H04W 52/42 |
| 2018/0014255 | A1* | 1/2018 | Pelletier | H04W 52/365 |
| 2018/0368083 | A1* | 12/2018 | Yang | H04B 7/0486 |
| 2019/0097710 | A1* | 3/2019 | Park | H04W 52/28 |
| 2019/0190747 | A1* | 6/2019 | Park | H04L 5/0057 |
| 2019/0327691 | A1* | 10/2019 | Zhang | H04W 52/226 |
| 2019/0327693 | A1* | 10/2019 | Rahman | H04W 52/42 |
| 2020/0021342 | A1 | 1/2020 | Ge et al. | |
| 2020/0045644 | A1* | 2/2020 | Sridharan | H04W 52/367 |
| 2020/0100327 | A1* | 3/2020 | Zhang | H04B 7/0486 |
| 2020/0186215 | A1* | 6/2020 | Rahman | H04L 5/0091 |
| 2020/0266867 | A1* | 8/2020 | Park | H04L 1/0681 |
| 2020/0267661 | A1* | 8/2020 | Park | H04B 7/0478 |
| 2020/0267701 | A1* | 8/2020 | Park | H04L 5/0053 |
| 2020/0336998 | A1* | 10/2020 | Rahman | H04W 8/24 |
| 2020/0367217 | A1* | 11/2020 | Wang | H04L 5/0094 |
| 2020/0382180 | A1* | 12/2020 | Wang | H04B 7/0482 |
| 2020/0382181 | A1* | 12/2020 | Wang | H04B 7/0404 |
| 2020/0382252 | A1* | 12/2020 | Sun | H04B 7/0626 |
| 2020/0383062 | A1* | 12/2020 | Wang | H04L 25/0226 |
| 2021/0273712 | A1* | 9/2021 | Wu | H04B 7/0639 |
| 2021/0288700 | A1* | 9/2021 | Liu | H04B 7/0456 |
| 2021/0289561 | A1* | 9/2021 | Liu | H04W 74/004 |
| 2021/0314037 | A1* | 10/2021 | Rahman | H04L 25/0226 |
| 2021/0314873 | A1* | 10/2021 | Huang | H04W 52/42 |
| 2021/0345253 | A1* | 11/2021 | Matsumura | H04B 7/0639 |
| 2021/0352596 | A1* | 11/2021 | Liu | H04W 52/146 |
| 2022/0007298 | A1* | 1/2022 | Huang | H04W 52/40 |
| 2022/0014252 | A1* | 1/2022 | Harrison | H04B 7/0617 |
| 2022/0015039 | A1* | 1/2022 | Huang | H04W 52/367 |
| 2022/0039031 | A1* | 2/2022 | Rahman | H04W 8/24 |
| 2022/0085946 | A1* | 3/2022 | Sun | H04B 7/0456 |
| 2022/0094404 | A1* | 3/2022 | Yao | H04B 7/0482 |
| 2022/0109474 | A1* | 4/2022 | Haghighat | H04B 7/0626 |
| 2022/0123897 | A1* | 4/2022 | Kwak | H04L 5/0051 |
| 2022/0200674 | A1* | 6/2022 | Rahman | H04B 7/0486 |
| 2022/0352954 | A1* | 11/2022 | Ren | H04B 7/0691 |
| 2022/0393738 | A1* | 12/2022 | Park | H04W 52/50 |
| 2024/0040513 | A1* | 2/2024 | Sun | H04B 7/0639 |

FOREIGN PATENT DOCUMENTS

| | | | | |
|---|---|---|---|---|
| CN | 103781163 | A * | 5/2014 | H04W 52/08 |
| CN | 108964723 | A | 12/2018 | |
| CN | 111052621 | A * | 4/2020 | |
| CN | 111095843 | A * | 5/2020 | |
| CN | 113424602 | A * | 9/2021 | |
| CN | 113424603 | A * | 9/2021 | H04B 17/327 |
| CN | 113491158 | A * | 10/2021 | H04B 7/0456 |
| CN | 113519131 | A * | 10/2021 | H04B 7/0465 |
| DE | 102021109966 | A1 * | 10/2021 | |
| EP | 2446546 | B1 * | 3/2017 | H04B 7/0628 |
| EP | 3913995 | A1 * | 11/2021 | |
| EP | 3920607 | A1 * | 12/2021 | |
| KR | 10-2018-0135874 | A | 12/2018 | |
| TW | 201106661 | A * | 2/2011 | H04L 5/0023 |
| TW | 201906455 | A | 2/2019 | |
| WO | WO-2010091425 | A2 * | 8/2010 | H04W 52/08 |
| WO | WO-2011011566 | A2 * | 1/2011 | H04L 5/0023 |
| WO | WO-2012153962 | A2 * | 11/2012 | H04W 52/146 |
| WO | WO-2013023586 | A1 * | 2/2013 | H04B 7/0456 |
| WO | WO-2015116866 | A1 * | 8/2015 | H04W 52/146 |
| WO | WO-2017196065 | A1 * | 11/2017 | H04W 52/146 |
| WO | WO-2017196612 | A1 * | 11/2017 | H04B 7/024 |
| WO | WO-2017200307 | A1 * | 11/2017 | H04L 1/1671 |
| WO | WO-2018009577 | A1 * | 1/2018 | H04B 7/024 |
| WO | WO-2018132781 | A1 * | 7/2018 | H04B 7/0456 |
| WO | 2018160130 | A1 | 9/2018 | |
| WO | 2018203728 | A1 | 11/2018 | |
| WO | WO 2018-0203728 | A1 | 11/2018 | |
| WO | 2019020050 | A1 | 1/2019 | |
| WO | WO-2019050329 | A1 * | 3/2019 | H04B 7/0404 |
| WO | WO-2018132781 | A9 * | 6/2019 | H04B 7/0456 |
| WO | WO-2019203619 | A1 * | 10/2019 | H04W 52/146 |
| WO | WO-2020028887 | A1 * | 2/2020 | H04B 7/0456 |
| WO | WO-2020031352 | A1 * | 2/2020 | H04B 17/11 |
| WO | WO-2020143733 | A1 * | 7/2020 | H04B 7/0413 |
| WO | WO-2020143805 | A1 * | 7/2020 | H04B 7/0426 |
| WO | WO-2020167747 | A1 * | 8/2020 | H04B 7/0426 |
| WO | WO-2020205505 | A1 * | 10/2020 | H04B 7/0404 |

(56) References Cited

FOREIGN PATENT DOCUMENTS

| WO | WO-2020218820 A1 | * | 10/2020 | ........... H04B 7/0404 |
| WO | WO-2020222274 A1 | * | 11/2020 | ........... H04B 7/0404 |
| WO | WO-2021034564 A1 | * | 2/2021 | ......... G06F 9/45558 |
| WO | WO-2021064962 A1 | * | 4/2021 | ........... H04B 7/0404 |
| WO | WO-2021088749 A1 | * | 5/2021 | ......... H04L 10/0023 |
| WO | WO-2021092218 A1 | * | 5/2021 | ........... H04B 7/0413 |
| WO | WO-2021142774 A1 | * | 7/2021 | ........... H04B 7/0413 |
| WO | WO-2023211837 A1 | * | 11/2023 | ........... H04B 7/0456 |

OTHER PUBLICATIONS

3rd Generation Partnership Project (3GPP), R1-1900907, "Full Tx Power for UL Transmissions", Qualcomm Incorporated, 3GPP TSG RAN WG1 Meeting AH-1901, Taipei, Taiwan, Jan. 21-25, 2019, 11 pages.

3rd Generation Partnership Project (3GPP), TS 38.213 V0.0.1, "Technical Specification Group Radio Access Network, NR, Physical Layer Procedures for Control (Release 15)", Jul. 2017, pp. 1-14.

3rd Generation Partnership Project (3GPP), R1-1900219, "Full Tx Power UL Transmission", MediaTek Inc., 3GPP TSG RAN WG1 Ad-Hoc Meeting 1901, Taipei, Taiwan, Jan. 21-25, 2019, 15 pages.

3rd Generation Partnership Project (3GPP), R1-1900701, "Discussion on full TX power for UL transmission", 3GPP TSG RAN WG1 Ad-Hoc Meeting 1901, Jan. 21-25, 2019, 4 pages.

* cited by examiner $$\mathbf{w}_i = \begin{bmatrix} x_1 & 0 & x_3 & 0 \end{bmatrix}$$
$$|x_1| = |x_3|, \quad x_i \in C$$

$$\mathbf{w}_j = \begin{bmatrix} 0 & x_2 & 0 & x_4 \end{bmatrix}$$
$$|x_2| = |x_4|, \quad x_i \in C$$

FIG. 4A

$$\mathbf{w}_i = \begin{bmatrix} x_1 & 0 & x_3 & 0 \end{bmatrix}$$
$$|x_1| = |x_3|, \quad x_i \in C$$

FIG. 4B

$$\mathbf{w}_j = \begin{bmatrix} 0 & x_2 & 0 & x_4 \end{bmatrix}$$
$$|x_2| = |x_4|, \quad x_i \in C$$

FIG. 4C

UL MIMO FULL TX POWER

CROSS-REFERENCE TO RELATED APPLICAIONS

This application is the National Stage Entry under 35 U.S.C. § 371 of Patent Cooperation Treaty Application No. PCT/US2020/017636, filed Feb. 11, 2020, which claims the benefit of U.S. Provisional Application No. 62/804,897, filed Feb. 13, 2019; U.S. Provisional Application No. 62/824,579 filed Mar. 27, 2019; U.S. Provisional Application No. 62/840,685 filed Apr. 30, 2019; U.S. Provisional Application No. 62/886,625, filed Aug. 14, 2019; U.S. Provisional Application No. 62/910,085, filed Oct. 3, 2019; and U.S. Provisional Application No. 62/932,074, filed Nov. 7, 2019, the contents of which are incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE). Wireless transmit/receive unit (WTRUs) may have different power amplifier architectures. In examples, full power transmission may not be achieved at a WTRU.

SUMMARY

A wireless transmit/receive unit (WTRU) may indicate a power rating of a power amplifier (PA) associated with the WTRU. For example, the WTRU may indicate a power rating per transmission (TX) chain. A WTRU may use a bitmap to indicate the coherence capability of its transmitter structure. A WTRU (e.g., a MIMO transmitter) may send a report related to the operating state of one or more PAs of the WTRU. A WTRU may override codebook subset restriction(s), e.g., according to one or more operational criteria. A WTRU may send a high-rated PA indication. PHR reporting for WTRU capability 3 (e.g., Cap3) may be performed. Cap3 may be supported by one or more PA architectures. A WTRU may indicate a codebook subset for Cap3. A WTRU may indicate single vs. multi-port (e.g., two-port) full power transmission. A WTRU may signal a capability for Mode 2 and/or may operate in Mode 2, e.g., for full power transmission.

Systems, methods, and instrumentalities are disclosed that are associated with a WTRU sending a full power transmission in the uplink (e.g., enabling full power use for uplink MIMO transmission). A WTRU may be configured, and may execute a procedure, to transmit to a network (e.g., in a first indication) a full power uplink transmission capability associated with the WTRU. The WTRU's full power uplink transmission capability may be, for example, Cap3. The WTRU may receive from a network (e.g., in a second indication) an indication of whether the WTRU is allowed to operate with full power transmission. The WTRU may determine (e.g., from a set of transmitted precoding matrix indicators (TPMIs)), a subset of TPMIs based on, for example, the WTRU's full power uplink transmission capability (e.g., where the subset of TPMIs includes a first TPMI). The set of TPMIs may comprise one or more subsets of TPMIs. A subset of TPMIs may be associated with a respective precoder structure. The WTRU may transmit to the network (e.g., in a third indication) an indication of the determined subset of TPMIs. The WTRU may identify the subset of TPMIs, for example, in an index. The WTRU may receive from the network (e.g., in a fourth indication) an indication of the first TPMI in the subset of TPMIs. The WTRU may determine (e.g., based on the network having indicated first TPMI) a precoder to precode uplink data. The WTRU may transmit to the network uplink data precoded with the first TPMI.

BRIEF DESCRIPTION OF THE DRAWINGS

FIG. 4A shows an example definition of two precoders, which may be denoted as $w_i$ and $w_j$.

FIG. 4B shows an example definition of a precoder, which may be denoted as $w_i$.

FIG. 4C shows an example definition of a precoder, which may be denoted as $w_j$.

DETAILED DESCRIPTION

Figure 1A:
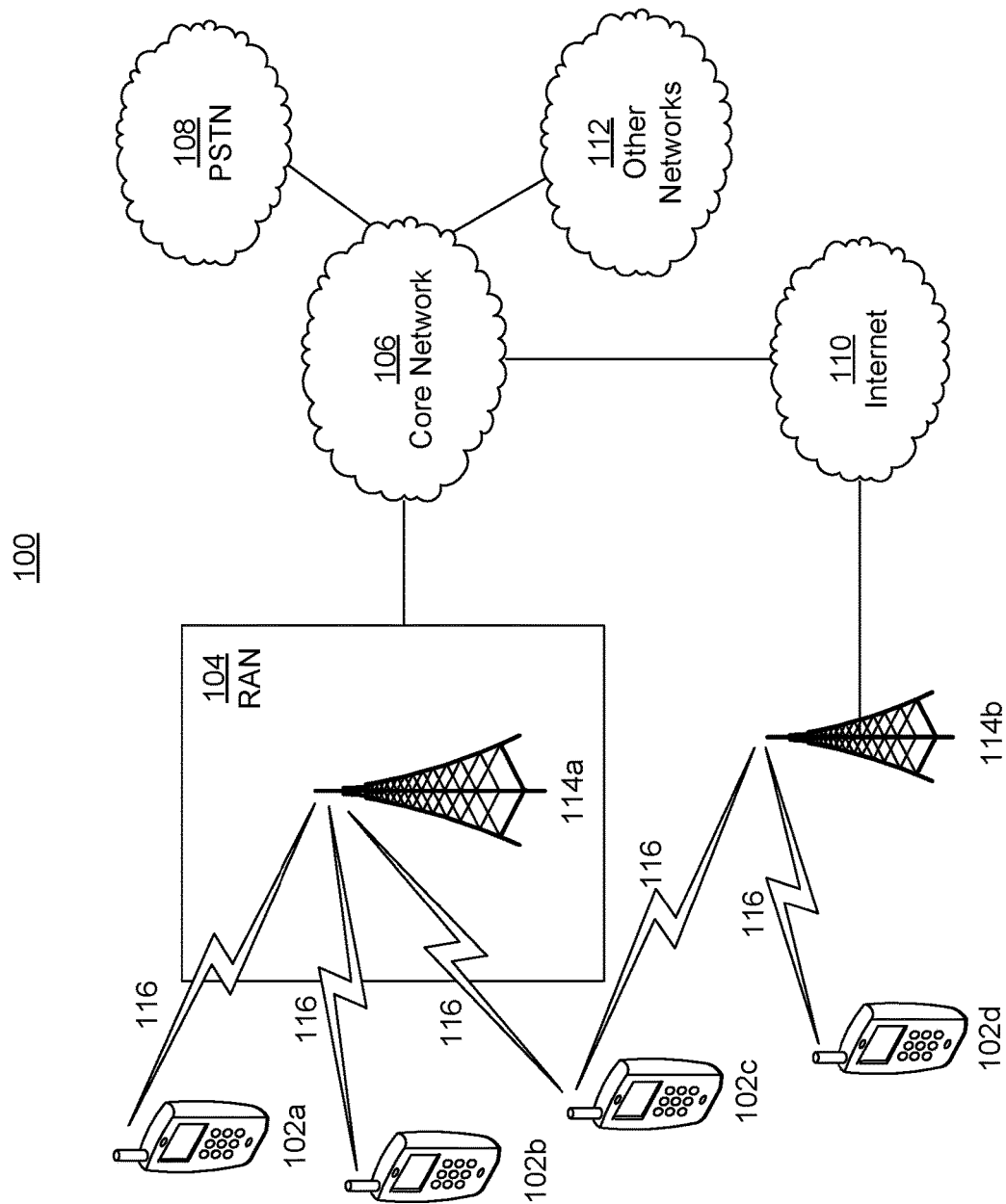
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform (DFT)-Spread orthogonal frequency division multiplexing (OFDM) (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
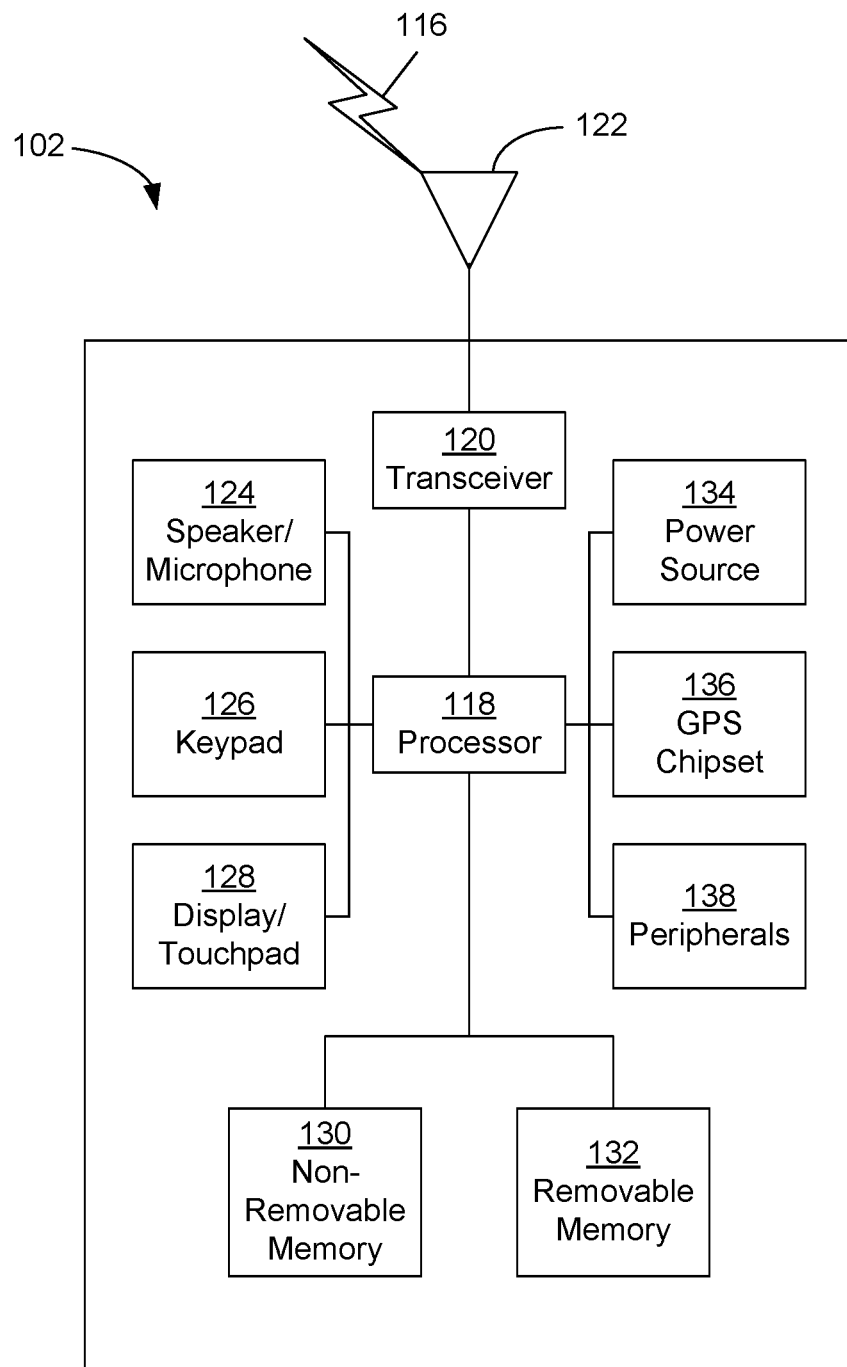
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the global positioning system (GPS) chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
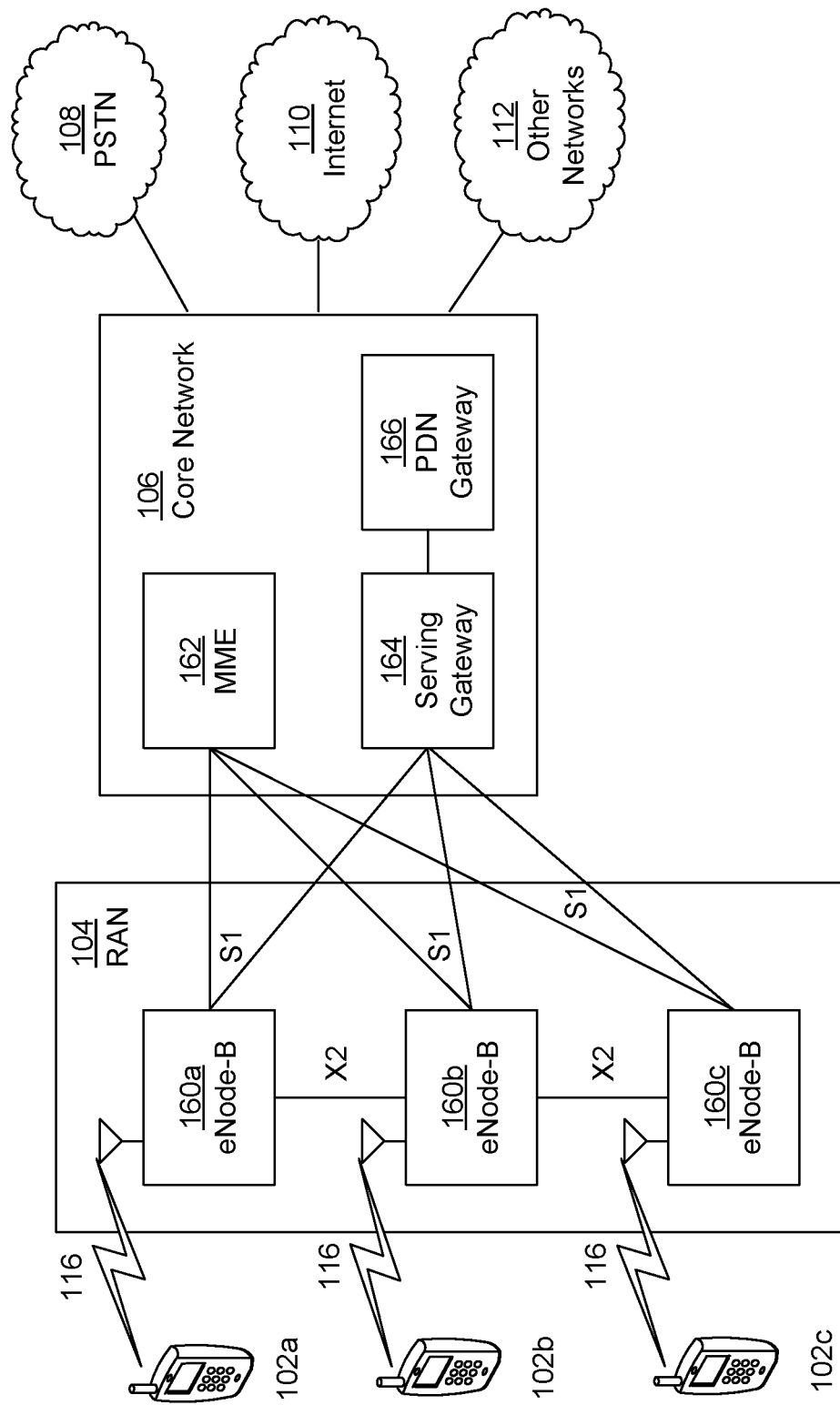
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as machine type communication (MTC) devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
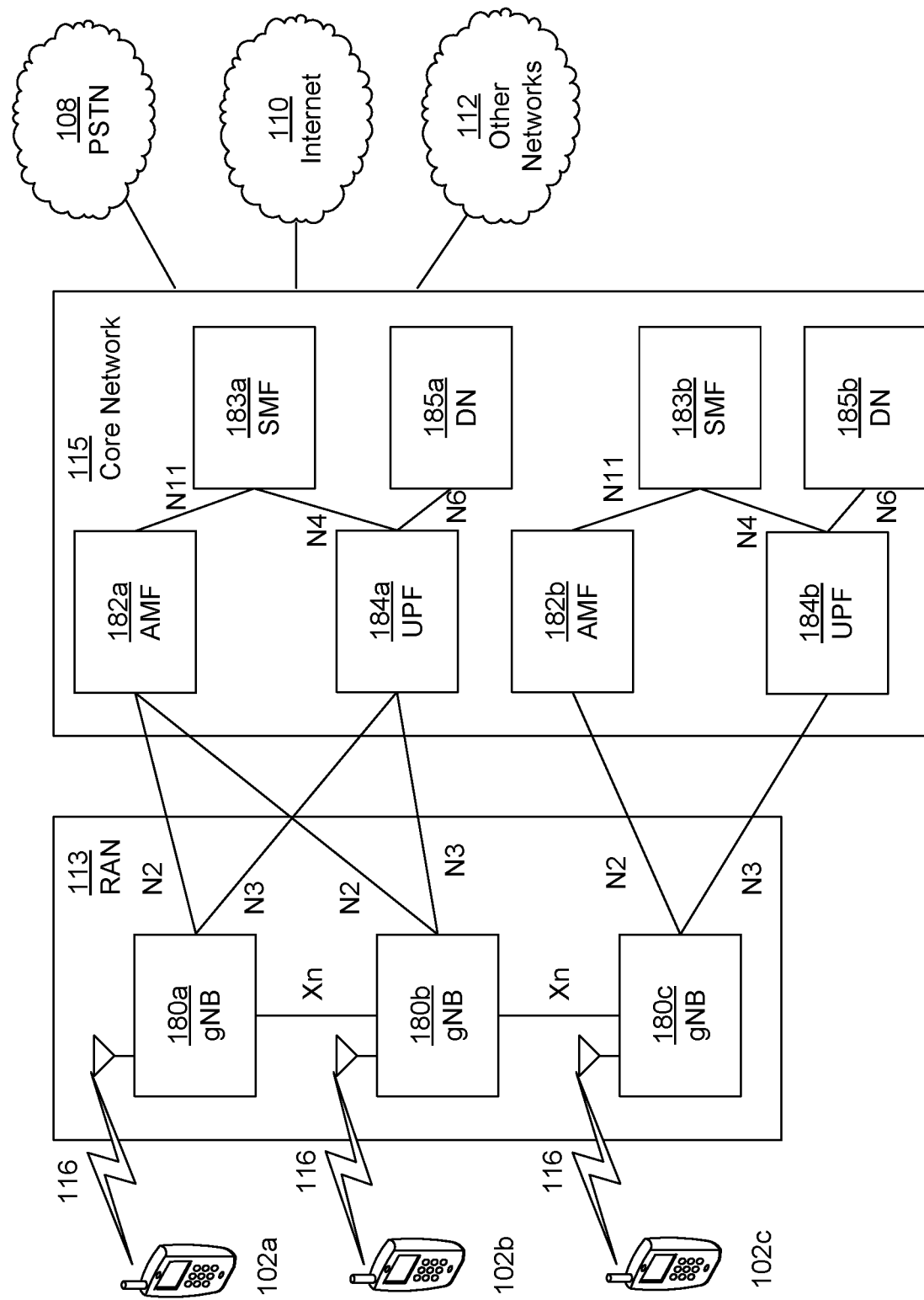
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of Non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3rd Generation Partnership Project (3GPP) access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A mismatch between different elements of a WTRU RF transmit chain may result in inaccurate precoding. WTRUs may have several (e.g., three) different transmission capabilities (e.g., in NR Rel-15) to support more reliable uplink transmissions. WTRU transmission capabilities may reflect the integrity of uplink transmissions (e.g., in terms of phase/time coherency), which may result from impairments.

ing FPNC capability). For example, for rank 1 transmission (e.g., as shown in Table 1), transmitted precoding matrix indicators (TPMIs) {0, 1, 2, 3} may enable antenna selection, while TPMIs {0, 4, 12} may be utilized for WTRU power saving (e.g., if needed). The power saving capability of a WTRU may be maintained (e.g., while antenna selection is supported), for example, by turning OFF/ON RF chains.

TABLE 1

NR Precoding matrix W for single-layer transmission using four antenna ports with transform precoding disabled

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

WTRU capabilities (e.g., which may be reported to a network) may include, for example, nonCoherent (NC), partialAndNonCoherent (PNC) and/or fullAndPartialAndNonCoherent (FPNC). Precoding may be adapted according to the coherence level of an antenna panel architecture. A subset of precoders may be allowed for transmission, for example, according to WTRU coherence capability. Full transmission (TX) power may not be achieved in WTRU precoding behavior, for example, where antenna selection may be performed through subset precoder selection (e.g., in NR Rel-15).

A power amplifier (PA) power rating per TX chain may be kept below the maximum total WTRU power due to one or more factors (e.g., WTRU cost, heat dissipation, and/or limited physical dimensions). Precoding that involves a form of antenna selection may (e.g., automatically) result in a reduced total power.

In examples, a codebook subset restriction result in an uplink multiple-input multiple-output (MIMO) transmission may be limited, for example, if a WTRU is not fully coherent.

Figure 2:
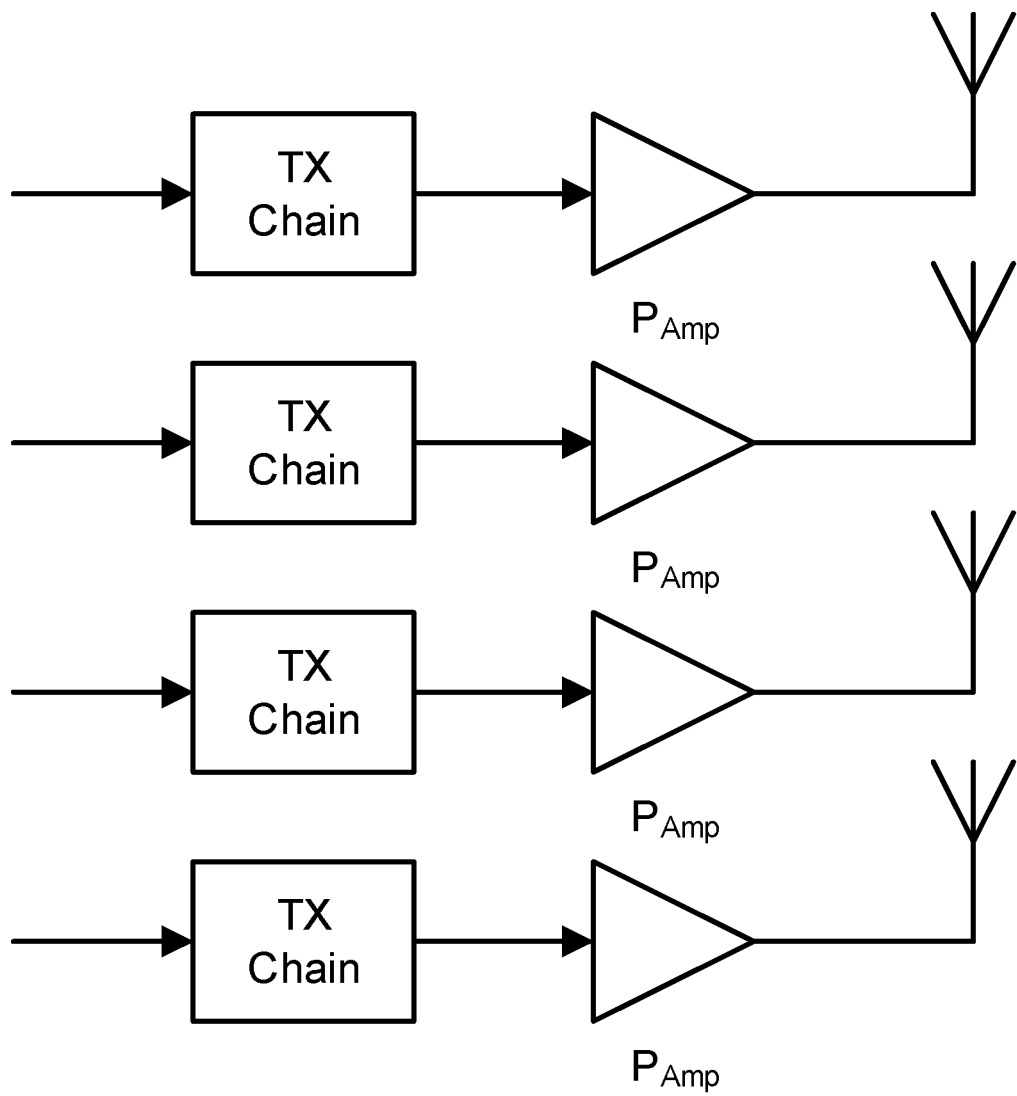
FIG. 2 shows an example of a MIMO transmitter with 4 TX antennas where the maximum output power of each transmitter chain may be limited by $P_{Amp}$.

FIG. 2 shows an example of a MIMO transmitter with 4 TX antennas where the maximum output power of each transmitter TX chain may be limited by $P_{Amp}$. An implementation based on FIG. 2 may support, for example, a total power of $P_{Total}=4\,P_{Amp}$.

Uplink transmission may support one or more (e.g., all) ranks, for example, with full power capability (e.g., assum- Full power utilization may not be achieved, for example, due to introduced codebook subset restriction(s), which may prevent a WTRU from operating at full power in certain scenarios (e.g., in the case of PNC or NC modes). In an example (e.g., in NC mode), NC TMPIs may not allow full uplink power utilization. In an example (e.g., for a Power Class 3 WTRU with $P_{Max}=23$ dBm), the total output power may not attain the expected full power (e.g., 23 dBm), for example, if the power rating of each WTRU PA is assumed to be lower (e.g., $P_{Amp}=17$ dBm). A power class for a WTRU may define a maximum output power for the WTRU. For example, a Power Class 3 WTRU may have a maximum output power level of 23 dBm, and a Power Class 2 WTRU may have a maximum output power level of 26 dBm. A MIMO transmitter may support delivery of the total output power of $P_{Max}$ (e.g., regardless of choice of precoder), for example, when the MIMO transmitter employs full rated PAs (e.g., $P_{Amp}=P_{Max}$, on each TX chain). A subset of TX chains may be equipped with full rated PAs). Total output power of $P_{Max}$ may be supported, for example, when the outputs of some of the TX chains are combined.

Full TX power UL transmission with multiple power amplifiers may be supported (e.g., in NR), for example, for codebook based UL transmission for non-coherent and partial/non-coherent capable WTRUs. Support of full TX power UL transmission with multiple power amplifiers may be indicated by a WTRU (e.g., as part of WTRU capability signaling). In an example (e.g., for power class 3), a WTRU may have one or more (e.g., three) WTRU capabilities. A WTRU capability may be WTRU capability 1 (e.g., Cap1), where (e.g., for the WTRU to support full Tx power in UL transmission), for example, full rated PAs on a Tx chain (e.g., each TX chain) may be supported (e.g., with a WTRU coherence capability). A WTRU capability may be WTRU capability 2 (e.g., Cap2), where (e.g., for the WTRU to support full Tx power in UL transmission), for example, no Tx chain may be assumed to deliver full power (e.g., with a WTRU coherence capability). A WTRU capability may be WTRU capability 3 (e.g., Cap3), where (e.g., for the WTRU to support full Tx power in UL transmission), for example, a subset of Tx chains with full rated PAs may be supported (e.g., with a WTRU coherence capability).

A codebook subset restriction result in uplink MIMO transmission may be limited, for example, if a WTRU is not fully coherent (e.g., FPNC capability). One or more implementations disclosed herein may be evaluated, for example, based on knowledge of the power ratings of power amplifiers (PAs) employed in a (e.g., each) transmitter chain. There may be PAs with different power ratings in a (e.g., each) transmitter chain. An indication mechanism may be used by a WTRU, for example, to convey information related to the WTRU's power rating and coherence capability (e.g., per panel/chain) to a gNodeB (gNB). Implementations based on antenna virtualization may be employed, for example, based on the conveyed information. In examples, power amplifiers with different ratings per chain may impact (e.g., cause or require changes in) WTRU behavior, such as for power headroom report (PHR) measurements and reporting.

A WTRU may send (e.g., transmit) a PA indication and/or a coherence capability indication. For example, the PA indication may be a PA rating indication. A WTRU, such as a Cap3 WTRU, may use PAs with higher power ratings (e.g., in some TX chains), for example, to compensate for lost power (e.g., due to zero power transmission on some layers). A WTRU may indicate a PA capability per TX chain. A capability indication may include information about the PA rating of a (e.g., each) TX chain. The information may be used by a gNB, for example, to determine WTRU maximum output power.

In examples, a WTRU with N TX chains may use a bitmap with length N bits, for example, to indicate which TX chains are equipped with full rated PAs. Other (e.g., remaining) TX chains may be assumed, for example, to employ PAs with a lower power rating (e.g., $P_{Amp}=P_{Max}/N$). In examples (e.g., for a Power Class 3 WTRU with 4 TX antennas), a bitmap "0 0 1 1" may indicate utilization of PAs with ratings "17 dBm,17 dBm, 23 dBm,23 dBm," while "0 0 0 0" may indicate an implementation based on "17 dBm,17 dBm, 17 dBm, 17 dBm" PA ratings.

A WTRU with N TX chains may use a bit-map with length N×M bits, for example, to indicate the power rating for a PA (e.g., each PA), where a resolution may be $2^M$ levels of rating per TX chain. The corresponding levels for a codeword (e.g., each codeword) may be defined, for example, according to WTRU power class. A WTRU may receive information about the desired level of quantization for reporting of its PA rating per TX chain. For example (e.g., for a Power Class 3 WTRU with 4 TX antennas), a bitmap with length 8 bits may indicate up to four different levels of power rating per TX chain, where the M (e.g., 2) bits per TX chain may be (e.g., a-priori) defined or configured, for example, in accordance with Table 2:

TABLE 2

Exemplary Bitmap

| M bits | PA Rating (dBm) |
| --- | --- |
| 00 | 17 |
| 01 | 20 |
| 10 | 23 |
| 11 | N/A |

In an example (e.g., according to Table 2), the bitmaps "00 00 01 01" and "00 00 01 10" may indicate respectively, for example, PA ratings of "17 dBm 17 dBm 20 dBm 20 dBm," and "17 dBm 17 dBm 20 dBm 23 dBm."

A WTRU may send a coherency indication. A WTRU may, for example, use a bitmap to indicate the coherence capability of its transmitter structure. A WTRU with N TX chains may, for example, use a bitmap with length N bits, e.g., to indicate which TX chains may be considered as coherent transmission units. In examples, "0" and "1" may indicate coherent and non-coherent transmission chains (e.g., panels). In examples (e.g., for a WTRU with 4 TX antennas), a bitmap "0 0 0 1" may indicate a PNC capable WTRU, for example, where the 4th transmit chain (e.g., panel) does not exhibit a coherent transmission behavior with respect to the first three transmit chains. A coherence capability may be indicated per pair of TX chains. For example (e.g., in a 4TX WTRU), the WTRU may use a 2-bit length bitmap to indicate the coherency of a (e.g., each) TX pair.

In examples, a WTRU may (e.g., implicitly) indicate a coherence capability of the WTRU through indication of a PA rating. In an example (e.g., where a WTRU with N TX chains uses a bitmap with length N bits to indicate which TX chains are equipped with a full rated PA), the indicated chains with full rated PAs may be assumed to be coherent transmit chains. For example (e.g., for a Power Class 3 WTRU with 4 TX antennas), a bitmap "0 0 1 1" may indicate utilization of PAs with the ratings "17 dBm, 17 dBm, 23 dBm, 23 dBm." Such a WTRU may (e.g., implicitly) indicate (e.g., in the foregoing PA ratings) that transmit chains 3 and 4 (e.g., 23 dBm and 23 dBm) are the coherent transmission units (e.g., panels).

The coherence capability of a WTRU may change, for example, based on one or more external factors (e.g., holding, proximity to reflective objects, near/far field effects resulted from other devices, etc.). A WTRU may (e.g., dynamically) update its state of coherency. The PA rating of a chain (e.g., each chain) may (e.g., also) be affected, for example, based on an updated state of coherency of a transmission chain. For example, a TX chain with rating $P_{Amp}$ may be deselected and substituted by another TX chain with a rating of $P_{Amp2}$. A WTRU may (e.g., dynamically) update its state of PA rating per chain.

WTRU behavior may be defined for unequal PA ratings. Reporting related to the operating state of PAs (e.g., PHR) may be computed and reported (e.g., for a MIMO transmitter with unequal PAs per chain), for example, to insure proper efficiency and linearity of PAs. As used herein, implementations described for PHR reporting may (e.g., additionally and/or alternatively) be considered and applied for other reporting.

In examples (e.g., for a MIMO transmitter with 4TX ports), first and second subsets of 2 ports may employ PAs with output power ratings of $P_{Amp\_A}$ and $P_{Amp\_B}$, ($P_{Amp\_A} \leq P_{Amp\_B}$), respectively. The WTRU power class may be assumed to be $P_{Amp\_B}$. The overall configuration of the transmitter may be shown as ($P_{Amp\_A}$, $P_{Amp\_A}$, $P_{Amp\_B}$, $P_{Amp\_B}$). In examples (e.g., for a PNC or an NC WTRU), a selection for transmission may be limited to a subset of ($P_{Amp\_A}$, $P_{Amp\_A}$, $P_{Amp\_B}$, $P_{Amp\_B}$). The expected transmitter power may be budgeted equally on all PAs. A problem may occur, for example, when the set power per WTRU approaches a configured power threshold, $P_{Thr}$. In examples, the configured threshold may be based on $P_{Amp\_A}$, or a value offset to $P_{Amp\_A}$.

A WTRU may send a $P_{Limit}$ indication to a network device (e.g., a gNB or base station). The WTRU may be configured (e.g., semi-statically or dynamically), for example, with a power threshold $P_{Thr}$. The WTRU (e.g., PNC-capable WTRU or NC-capable WTRU) may send an indication (e.g., a $P_{Limit}$ indication) to the network device (e.g., gNB or base station). The $P_{Limit}$ indication may indicate that the WTRU has reached a power level where the WTRU may not be able to support higher power levels through equal split power operation. An indication may be triggered, for example, upon (e.g., as a result of) reaching (e.g., or exceeding) the power threshold. The WTRU may (e.g., dynamically) send the $P_{Limit}$ indication through, for example, a bit or a flag indication. The WTRU may send the indication, for example, in a PH report (PHR). The WTRU may convey the information, for example, using a MAC element (e.g., a MAC control element (MAC-CE)), a channel state information (CSI) feedback indication (e.g., an out of range value, such as a channel quality indicator (CQI)=0), Radio Resource Control (RRC) signaling as an event, or any other indication/flag (e.g., dynamic indication or flag) that may be designated for this purpose.

In examples (e.g., associated with a MIMO transmitter), a first subset of PAs and a second subset of PAs, with maximum output power ratings of $P_{Amp\_A}$ and $P_{Amp\_B}$, respectively, may be used for transmission (e.g., where $P_{Amp\_A} \leq P_{Amp\_B}$). Antenna ports may be virtualized, for example, to combine the output powers to produce a total power of greater than $P_{Amp\_A}$.

Trigger mechanisms may be implemented for $P_{Limit}$. In examples, a WTRU may send (e.g., or may be triggered to send) an indication (e.g., a $P_{Limit}$ indication), for example, when at least one PA power limit triggering condition is met (e.g., occurs or is satisfied). A PA power limit triggering condition may be met, for example, if at least one event occurs, such as at least one of the following example events. A PA power limit triggering condition may be met, for example, if the output power of a (e.g., at least one) PA exceeds a threshold (e.g., a threshold number of dB). A PA power limit triggering condition may be met, for example, if the output power of a (e.g., at least one) PA is within a threshold (e.g., a threshold number of dB) from a value (e.g., a configured value or a WTRU determined value), which may be a maximum value. A PA power limit triggering condition may be met, for example, if the output power of a (e.g., at least one) PA changes by more than a threshold (e.g., a threshold number of dB). A PA power limit triggering condition may be met, for example, if the output power of a (e.g., at least one) PA is at a maximum value (e.g., a configured maximum value or a WTRU determined maximum value). A PA power limit triggering condition may be met, for example, if the output power of a (e.g., at least one) PA is not or is no longer at a maximum value (e.g., a configured maximum value or a WTRU determined maximum value). A PA power limit triggering condition may be met, for example, if the output power of at least one PA (e.g., all the WTRUs PAs) does not exceed or no longer exceeds a threshold. A PA power limit triggering condition may be met, for example, if the output power of at least one PA (e.g., out of the WTRU's PAs) are not at or are no longer at a maximum value. A PA power limit triggering condition may be met, for example, if the output power of at least one PA (e.g., out of the WTRU's PAs) are not within or are no longer within a threshold from a value, which may be a maximum value.

A threshold (e.g., a threshold value) may be configured. A configuration of a threshold may be received, for example, from a gNB or base station. A threshold may be a threshold number of decibels (dBs). A threshold may be determined by a WTRU (e.g., based on its implementation). A maximum value may be configured for a threshold. A maximum value may be determined by a WTRU (e.g., based on an implementation). A configured value (e.g., to determine whether the output power of a PA is within a threshold) may be received, e.g., from a gNB or base station. A PA may be a PA of a WTRU.

A (e.g., at least one) PA power limit triggering condition may be met, which may trigger a WTRU to send a $P_{Limit}$ indication, for example in a PHR, in a (e.g., another) MAC control element (MAC-CE), in physical layer signaling (e.g., in uplink control information (UCI), in a physical uplink control channel (PUCCH), using a sounding reference signal (SRS), etc.), or in other signaling.

A PHR may be an example of signaling used to send a $P_{Limit}$ indication. A WTRU may trigger (e.g., sending) a PHR or other signaling that may include a $P_{Limit}$ indication, for example, if a PA power limit triggering condition is met. A $P_{Limit}$ indication may indicate (e.g., when set to a first value or state) that one or more PAs of a WTRU are at or near a power limit. A $P_{Limit}$ indication may indicate (e.g., if set to a second value or state) that the one or more (e.g., all) of a WTRU's PAs are not at or near (or are no longer at or near) a power limit.

A $P_{Limit}$ indication may indicate (e.g., when set to a first value or state) that the output power of at least one of the WTRU's PAs has reached or exceeded a threshold. The $P_{Limit}$ indication may indicate (e.g., when set to a first value or state) that the output power of at least one of the WTRU's PAs is within a threshold from a value (e.g., a configured value or a WTRU determined value), which may be a maximum value.

A $P_{Limit}$ indication may indicate (e.g., if set to a second value or state) that the output power of at least one of the WTRU's PAs (e.g., all the WTRU's PAs) are not at, are not above, are no longer at, or are no longer above, a threshold. A $P_{Limit}$ indication may indicate (e.g., if set to a second value or state) that the output power of at least one of the WTRU's PAs (e.g., all the WTRU's PAs) are not at, or are no longer within, a threshold from a value (e.g., a configured value or WTRU determined value), which may be a maximum value.

A $P_{Limit}$ indication, sending a $P_{Limit}$ indication, and/or a PHR or other signaling that may include a $P_{Limit}$ indication, may be triggered, for example, if the output power of a PA (e.g., a PA with a lower power rating, such as $P_{Amp\_A}$), reaches within x dB of a threshold $P_{Thr}$. The value of x may be a configured value (e.g., 1, 2, or 3 dB).

A $P_{Limit}$ indication, sending a $P_{Limit}$ indication, and/or a PHR or other signaling that may include a $P_{Limit}$ indication, may be triggered, for example, if the difference from $P_{Amp\_A}$ to a power cap value $P_{Cap}$ changes (e.g., by more than a threshold).

Triggering a $P_{Limit}$ indication, a PHR, or other signaling that may include a $P_{Limit}$ indication may be conditioned on a timer (e.g., expiry of a timer). For example, a regular prohibit timer (e.g., an existing prohibit timer) or a new prohibit timer may be used as a trigger. Triggering or sending a $P_{Limit}$ indication, a PHR, or other signaling that may include a $P_{Limit}$ indication may be conditional, for example, based on expiry of a prohibit timer (e.g., an existing prohibit timer or a new prohibit timer).

A PHR report may be triggered, for example, if at least one PA power limit triggering condition is met. A single bit may be used to indicate $P_{Limit}$. A WTRU may send (e.g., may also send) a PHR or another event report, for example, if the WTRU reaches the power threshold $P_{Thr}$. A $P_{Limit}$ indication may be part of a triggered PHR or other event report. A report may indicate a subset of the PAs affected by the power limitation. A report may indicate how a PHR calculation may be performed (e.g., following the event reporting), such as, for example, how many antenna ports are still active (e.g., how further power splits may be done).

A WTRU may indicate in a PHR (e.g., or other signaling) the number of PAs for which a PA power limit triggering condition is met. The WTRU may indicate for which of the PAs a PA power limit triggering condition is met. The WTRU may indicate PAs (or a number of PAs) for which no PA power limit triggering condition is met.

A WTRU may indicate in a PHR (e.g., or other signaling) when the WTRU can no longer support (or is within a threshold of no longer being able to support) the current TPMI subset (e.g., due to a power limit of at least one of its PAs). The WTRU may indicate in a PHR (e.g., or other signaling) that the WTRU is able to support the current TPMI subset, for example, if the conditions change and the WTRU becomes able to support the current TPMI subset.

A WTRU may include in a PHR (e.g., or other signaling) a power headroom (PH) for a PA, for example, for a PA for which the WTRU is indicating that a PA power limit condition has been met. The PH may indicate the difference between the PA max output power and the current PA output power.

One or more actions may be implemented in connection with a $P_{Limit}$ indication. In examples (e.g., concerning a MIMO transmitter), antenna virtualization may require a higher linearity and/or spectrum mask than transmission with a single antenna case. For example, a spectrum emission mask of a 23 dBm amplifier may, for example, be preferred to that of a combined output of two amplifiers with the same rating (e.g., each run at 20 dBm to produce 23 dBm output power). A $P_{Limit}$ indication may be used, for example, to indicate a preferred transmission feature. In examples (e.g., concerning 4 TX MIMO transmission power class 3 (PC3) with [23 17 17 17] dBm architecture), a gNB may schedule a PNC full power capable WTRU for a rank 2 transmission. A WTRU may (e.g., accordingly) virtualize two 17 dBm ports to support $P_0$ dBm for the first layer, and employ the TX chain with 23 dBm PA to support the same $P_0$ dBm for the second layer, e.g., producing ($P_0$+3) dBm in total. Lower rated PAs may be run at their full power rating of 17 dBm, which may impact other transmission features (e.g., spectrum emission). A WTRU may request rank reduction (e.g., so that a single layer transmission may be supported by the 23 dBm PA), for example, on a condition of reaching a configurable threshold, e.g., $P_{Limit}$.

A WTRU may adjust a configured $P_{cmax}$ value (e.g., based on the WTRU's PA rating capability) to $P_{cmax\_adj}$. An adjustment may be based on a scaling factor $a_{Limit}$, for example, where $P_{cmax\_adj}=a_{Limit}P_{cmax}$, and where $a_{Limit}=1$ when $P_{Limit}$ conditions are not met. The adjustment may be automatically adjusted, for example, if $P_{Limit}$ is indicated. $P_{cmax}$ may (e.g., may also) be automatically adjusted, for example, by a fixed or preconfigured value, e.g., 2 dB. A $P_{cmax}$ value for a WTRU may represent a value configured by a network device (e.g., a gNB) to define a maximum allowed power for the WTRU.

A WTRU may use another power level (e.g., $P_{cmax\_adj}$), e.g., instead of $P_{cmax}$, to compute a supplementary PHR (e.g., $PHR_{Sup}$). The WTRU may indicate information about $PHR_{Sup}$, for example, in the form of an offset, actual value, etc. (e.g., besides the original PHR value computed based on Pcmax). In an example, a WTRU may compute and report an average of the pair (PHR, $PHR_{Sup}$) (e.g., only compute and report the average of the pair, compute and report the average of the pair along with other information, etc.). A WTRU may report the smaller of the pair (PHR, $PHR_{Sup}$).

A network may use a fallback configuration (e.g., for further UL scheduling), for example, on a condition of receiving a $P_{Limit}$ indication. The fallback configuration may be implicitly acknowledged by the network, for example, by using a fallback downlink control information (DCI), for example Format 0-0, which may be instead of DCI Format 0-1 (e.g., which may be used for UL multi-antenna scheduling). A WTRU may receive a fallback configuration separately, or along with a configured $P_{Thr}$ threshold. The fallback configuration may comprise transmission restrictions for the WTRU, e.g., for the duration of the power limitation time.

A WTRU may stop processing transmit power control (TPC) UP commands or accumulated TPC UP commands received from the base station, for example, if a PA power limit triggering condition is met, or if a WTRU sends the $P_{Limit}$ indication. A WTRU may reset the accumulated TPC commands and/or may start a transmission based on the allocations received in a DCI, for example, if the WTRU receives the DCI with a scheduling for a fallback. The WTRU may split the power (e.g., accordingly) over the remaining active antenna ports.

A WTRU may process or accumulate (e.g., continue or resume processing or accumulating) TPC UP commands, for example, if at least one PA power limit triggering condition is not met or is no longer met. A WTRU may process or accumulate (e.g., continue or resume processing or accumulating) TPC UP commands, for example, if at least one PA power limit triggering condition (e.g., all PA power limit triggering conditions) are not met or are no longer met.

A WTRU may send a $P_{Normal}$ indication to a network device (e.g., a gNB or a base station). A WTRU may, for example, pair a $P_{Limit}$ indication with a below threshold indication (e.g., $P_{Normal}$). The WTRU may return to a state where the WTRU's non-zero transmission ports may match the expected power output. A $P_{Normal}$ indication may be triggered, for example, based on the current power supported by a subset of PAs, or a pathloss estimation along with a virtual physical uplink shared channel (PUSCH) allocation used in the active TX chain subset. This may take the form of a virtual PHR, for example, along with a below-threshold $P_{Thr}$ indication (e.g., $P_{Limit}$), and the virtual available power for the unused subset of PAs. Similar information may be sent to the network, for example, along with the $P_{Normal}$ indication (e.g., as an event report).

A network may receive an indication of $P_{Normal}$, indicating a return to a normal power state (e.g., where power is split equally across the non-zero ports). The network may send (e.g., in response to indication) an implicit acknowledgement to the WTRU, for example, by sending DCI Format 0-1. The WTRU may initiate a PHR report, for example, if the WTRU receives a DCI Format 0-1.

A WTRU may be configured, for example, with two power thresholds (e.g., $P_{Thr\_High}$ and $P_{Thr\_Low}$), for example, to create a hysteresis switch preventing alternate switching between $P_{Limit}$ and $P_{Normal}$ indications.

A WRTU may be configured, for example, with a timer $T_{Thr}$ and/or timers $T_{Thr\_High}$ and $T_{Thr\_Low}$ (e.g., in addition to $P_{Thr\_High}$ and $P_{Thr\_Low}$). The timers (e.g., $T_{Thr}$ and/or $T_{Thr\_High}$ and $T_{Thr\_Low}$) may be used, for example, to delay a WTRU report that the WTRU has crossed a threshold, e.g., the $P_{Thr\_High}$ or $P_{Thr\_Low}$ thresholds by $T_{Thr}$ (e.g., which may be expressed in ms, tens of ms, or hundreds of ms, for example). The timers may be used to avoid ping-pong reporting of the WTRU being above/below thresholds to the report receiving entity.

A WTRU may reset the TPC UP commands and/or the accumulated ones and start fresh for the allocation received in the DCI, for example, if a WTRU sends a $P_{Normal}$ indication event. The WTRU may maintain the accumulated TPC commands and resume processing of the TPC commands, for example, if the WTRU sends the $P_{Normal}$ indication event.

A WTRU may override a codebook subset restriction(s). Codebook subset restriction(s) for uplink MIMO may be used, for example, to address a potential mismatch between the coherence capability and a choice of precoding. A WTRU may (e.g., through codebook subset restriction(s)) be prevented from applying certain precoder(s) that rely on non-coherent panel(s).

A WTRU may override codebook subset restriction(s), for example, according to certain operational criteria. An override may allow all or a subset of initially-denied precoders to be considered for precoding. In an override mode (e.g., an override codebook subset restriction mode), A WTRU may consider additional precoders that do not exist in a codebook (e.g., an original codebook). A WTRU may be configured to (e.g., dynamically or semi-statically) override codebook subset restriction(s). The override may be persistent or semi-persistent for a duration of a configured period. A WTRU may switch in and out of override mode, for example, based on a comparison of the WTRU's operational parameter to a configured threshold (e.g., or another parameter). A WTRU may remain in override mode, for example, until the WTRU receives an exit instruction.

A WTRU may be configured in the override mode, for example, based on a determination that the WTRU is a far distance from gNB or a poor channel. The determination may be based on a measurement (e.g., signal-to-interference-plus-noise ratio (SINR), pathloss, CQI, radio resource management (RRM), rank, etc). For example, a WTRU may (e.g., to avoid power loss) override codebook subset restriction(s), for example, if the WTRU's estimated SINR falls below a threshold for MIMO spatial processing. A WTRU may have access to one or more (e.g., all) precoders, for example, including precoders projecting on non-coherent panels, for its rank 1 transmission.

A WTRU may switch to the override mode, for example, if the available transmission power dips below a configured threshold. The WTRU may override codebook subset restriction(s), for example, if the (e.g., required) power is larger than $P_{cmax}$ and/or the WTRU Power Class. A WTRU may (e.g., by entering the override mode) be able to reduce the gap between its transmit power and the expected power (e.g., set by power control).

A WTRU with full power capability (e.g., Capability 2) may enter or exit an override codebook subset restriction mode (e.g., an override mode), for example, upon reporting a measurement (e.g., PHR, reference signal receive power (RSRP), rank, CQI, SINR, etc.) that is not within an expected (e.g., preconfigured) range. An expected range may be defined, for example, in the form of a duration of an observation and/or a number of related events. The duration of time and thresholds for entering the override mode may be different from the duration of time and thresholds for exiting the override mode. In examples, a WTRU may enter the override mode, for example, if a measurement is above or below a first threshold for a first amount of slots. A WTRU may exit the override mode, for example, if the measurement is above or below a second threshold for a second number of slots. In examples, a WTRU may enter the override mode, for example, if a measurement is above the first threshold for two slots. A WTRU may exit the override mode, for example, if the measurement is below the second threshold for five slots. The first and second thresholds and/or the first and second numbers of slots may be the same or different.

A WTRU may enter the override mode, for example, if a reported PHR or RSRP measurement is (e.g., consistently) less than a threshold for a (e.g., pre-defined) length of transmission, and/or if the reported PHR or the RSRP measurement is less than a threshold N times out of M transmissions or measurement events. The WTRU may exit the override mode, for example, by reporting a PHR or an RSRP measurement that is consistently above a threshold for an (e.g., a pre-configured) observation time and/or if the reported PHR or the RSRP measurement is above a threshold N times out of M transmission or measurement events.

A WTRU (e.g., with full power capability) may enter or exit the override codebook subset restriction mode, for example, based on one or more configured transmission features (e.g., modulation coding scheme (MCS), rank, etc.). Configured transmission features may imply operation at the cell edge. For example, a cell edge WTRU may be scheduled with a low modulation order and/or a low code rate that may imply operation at the cell edge (e.g., where the WTRU may be expected to operate at a high power).

A WTRU may be indicated (e.g., implicitly) to enter the override codebook subset restriction, for example, based on a received command (e.g., TPC, re-transmission request, etc.). A WTRU may enter the override mode, for example, if the WTRU receives more than a number of re-transmission requests, e.g., over a period. The number of re-transmission requests and/or the duration of the period may be preconfigured. A WTRU may enter the override mode, for example, if the WTRU receives more than a number of TPC up commands, e.g., over a period. The number of TPC up commands and/or the duration of the period may be pre-configured.

A WTRU reporting the WTRU's capability of 'partialAndNonCoherent' transmission may be configured, for example, by an RRC parameter (e.g., a codebookSubset parameter). An RRC parameter may include at least one precoder from a 'fullyAndPartialAndNonCoherent' codebook, for example, if a WTRU capable of full power transmission power is configured for full power transmission.

A WTRU reporting its WTRU capability of 'nonCoherent' transmission may be configured, for example, by an RRC parameter (e.g., a codebookSubset parameter). An RRC parameter may include at least one precoder from a 'fullyAndPartialAndNonCoherent' codebook and/or from a 'partialAndNonCoherent' codebook, for example, if a WTRU capable of full power transmission power is configured for full power transmission.

A WTRU may send a high-rated PA indication. PHR reporting may be performed for WTRU capability 3 (e.g., Cap3). In examples, high-rated PAs (e.g., full-rated PAs)

may be used on (e.g., only on) a subset of TX RF chains, for example, in a WTRU with a capability of Cap3. The terms "high-rated," "higher-rated," and "full-rated" may be used interchangeably, as may be the terms "low-rated" and "lower-rated." A WTRU (e.g., with a capability of Cap3) may support high (e.g., full) power transmission using (e.g., only using) a subset of precoders.

Figure 3:
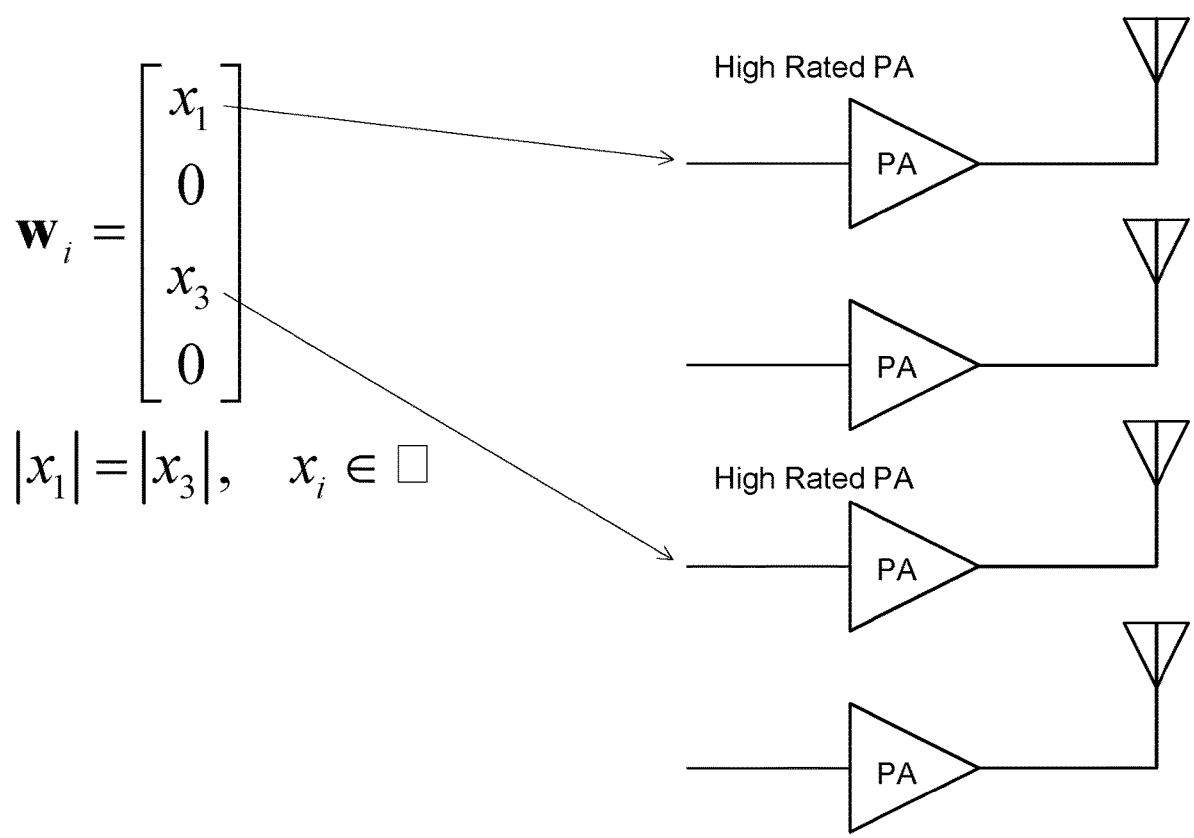
FIG. 3 shows an example of a MIMO transmitter with 4 TX antennas where high-rated PAs may be placed on the first and third TX RF chains and low-rated PAs may be placed on the remaining RF chains.

FIG. 3 shows an example of a MIMO transmitter with 4 TX antennas where high-rated PAs may be placed on the first and third TX RF chains and low-rated PAs may be placed on the remaining TX RF chains. As shown in FIG. 3, a subset of precoders may be considered for full-power transmission, for example, if high-rated PAs are placed on the first and third TX RF chains, and the remaining RF chains are (e.g., only) equipped with low-rated PAs (e.g., $P_{Amp}=17$ dBm).

A WTRU may indicate or be indicated (e.g., provided with) a subset or subsets of precoders (e.g., supported by the WTRU's coherency capability) that are able to support full-rated power transmission. In an example, there may be 4 TX antennas, and a WTRU may be equipped with 2 full-rated PAs. A WTRU may indicate the subset suited for full-power transmission, for example, using an information element (e.g., a single bit). For example (e.g., considering the codebook of Table 1), an indicated information element may be used to distinguish between two precoders, which may be denoted as $w_i$ and $w_j$, for example. In examples, $w_i$ and $w_j$ may be defined as shown in FIG. 4A.

An indication (e.g., similar to one described herein) may be used to convey the location of a high-rated PA (e.g., for consideration by a gNB scheduler), for example, if a single high-rated PA (e.g., 23 dBm) is used (e.g., for a 2TX WTRU).

A WTRU may be instructed to apply precoders beyond the reported set, for example, if a WTRU reports the supported subset for high-power (e.g., full-power) transmission.

A WTRU may determine, e.g., implicitly or explicitly, for example, that the WTRU is instructed to apply precoding (e.g., only) according to its indicated subset for high-power transmission.

A WTRU may determine and/or apply precoding according to the indicated subset for high-power transmission, for example, according to a measurement (e.g., pathloss). In examples, a cell-edge WTRU may assume that the cell-edge WTRU is limited to use precoding according to its indicated subset for high-power transmission, for example, if its estimated pathloss is greater than a fixed or configured threshold.

A WTRU may determine and/or apply precoding according to the WTRU's indicated subset for high-power transmission, for example, according to power allocation against Pcmax (e.g., based on the high-rated PA pair) versus the lower-rated power PA pair. A WTRU may use the lower-rated power PAs subset, for example, if the total allocated power is higher than total power available for the lower-rated power pair. A WTRU may use the higher-power rated pair, for example, if the total allocated power is not higher than the total power available for the lower-rated power pair.

In examples, a WTRU may have a subset of PAs that are high-rated (e.g., full-rated) and a subset of PAs that are lower rated (e.g., as shown by example PA architecture in FIG. 3). A WTRU may compute and report PHR according to the rating of the higher-rated PAs. In examples (e.g., in a 4 TX antenna configuration), the PHR computation may be based on the higher-rated PAs, for example, if the first and third PAs are 23 dBm and the remaining PAs are 17 dBm.

In examples, a lower PA's rating may be higher than the minimum expected rating (e.g., 20 dBm>17 dBm in a 4TX WTRU). A WTRU may compute and report a first and second PHR and/or a PHR and an offset value to indicate two PHR values. In examples, one PHR value may be based on a higher subset, e.g., 23 dBm PA subset, and one PHR value based on a lower subset, e.g., 20 dBm subsets.

A PHR report may be based on high-rating PAs. A PHR report may include (e.g., only include) a power offset relative to the high-power rated PA pair. A PHR report may be an extended PHR report.

A base station may be aware of the RF architecture of an WTRU (e.g., the power rating of the PAs), for example, for Cap3. The PHR may contain an indication, e.g., in the form of a bit, for example, to designate whether the PHR references higher- or lower-rated PAs.

TABLE 3

Exemplary PAs for a Capability 3 WTRU

| | PA1 (dBm) | PA2 (dBm) | PA3 (dBm) | PA4 (dBm) | Full power capability |
|---|---|---|---|---|---|
| Option 1 | 17 | 17 | 17 | 23 | Single port and two ports |
| Option 2 | 17 | 17 | 20 | 20 | Single port, two and three ports |
| Option 3 | 17 | 17 | 20 | 23 | Single and two ports, and three ports |
| Option 4 | 17 | 17 | 23 | 23 | Single and two ports, and three ports |
| Option 5 | 17 | 20 | 20 | 23 | Single and two ports, and three ports |
| Option 6 | 17 | 23 | 23 | 23 | Single, two and three ports |
| Option 7 | 20 | 20 | 23 | 23 | Single, two and three ports |

Table 3 shows exemplary cases of PAs (e.g., PA architectures), for example, for a 4TX WTRU. A mix of low- and high-rated PAs may be placed at a TX branch (e.g., each TX branch), e.g., as shown in Table 3. An architecture (e.g., each architecture) may support a certain coverage of full power capability (e.g., assuming port combining or virtualization), for example, as shown in the "Full power capability" column of Table 3.

A Cap3 WTRU may indicate a number of antenna ports on which it may support full power transmission. For example, a Cap3 WTRU with 4 TX antennas may indicate whether it supports full transmit power over one or more ports.

A WTRU may indicate (e.g., only indicate) whether its PA architecture supports full power over one or two ports (e.g., assuming use of the codebook shown in Table 1).

A WTRU may determine whether a single- or two-port precoder subset may be used, for example, based on an nrofSRS-Ports parameter in SRS-Config.

A WTRU may be configured with (e.g., only) one subset of precoders with antenna selection capability, for example, to support different potential WTRU architectures. For example, a WTRU with 4 TX antenna ports may be configured with one of a $w_i$ or a $w_j$ subset of precoders. The $w_i$ subset may be defined as shown in FIG. 4B and the $w_j$ subset may be defined as shown in FIG. 4C.

For example (e.g., from the codebook defined in Table 1), precoders $w_j$ may be limited to precoders with TPMI indices 8-11.

In an example, a WTRU may determine and may indicate (e.g., to a gNB) a precoder matrix subset according to the WTRU's PA architecture, for example, to enable the WTRU to achieve full power for gNB indicated transmitted precoding matrix indicators (TPMIs).

A WTRU may indicate when full power transmission is desirable (e.g., needed).

Figure 5:
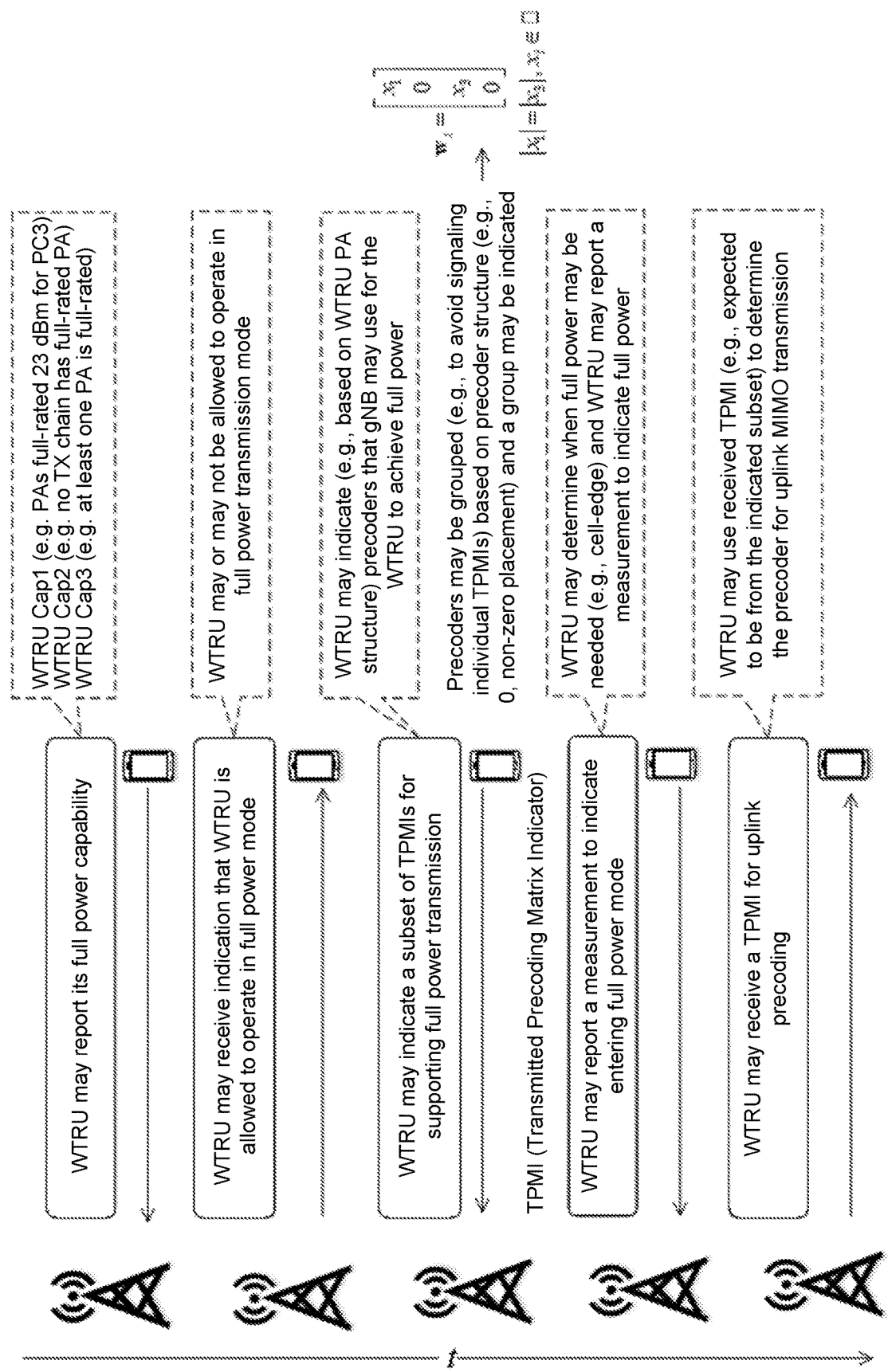
FIG. 5 shows an example implementation for a WTRU full power transmission mode.

FIG. 5 shows an example associated with a WTRU full power transmission mode. A WTRU may perform one or more of the following. A WTRU may transmit (e.g., report) a full power uplink transmission capability. For example, as illustrated in FIG. 5, a WTRU may report Cap1 (e.g., PAs full-rated, such as 23 dBm for PC3), Cap2 (e.g., no TX chain has a full-rated PA) or Cap3 (e.g., at least one PA is full-rated). A WTRU may receive (e.g., from the network) an indication whether the WTRU is allowed to operate in full power transmission mode. For example, a WTRU may receive a configuration that allows operation with full power transmission. The WTRU may determine from a set of TPMIs a subset of TPMIs that corresponds to full power support in the WTRU (e.g., where the set of TPMIs is comprised of multiple subsets and each subset is grouped based on a precoder structure). The WTRU may indicate a subset of TPMIs for full power transmission. For example, a WTRU may transmit an indication of the determined subset (e.g., using an index). A WTRU may indicate (e.g., based on WTRU PA structure) precoders, e.g., that the network (e.g., gNB) may use for the WTRU to achieve full power. Precoders may be grouped (e.g., to avoid signaling individual TPMIs) based on precoder structure (e.g., 0, non-zero placement) and a group may be indicated.

A WTRU may determine whether full power transmission is desirable, (e.g., needed, for example, at a cell-edge) based on a measurement. A WTRU may report the measurement to indicate that the WTRU is entering full power transmission mode. The WTRU may receive an indication of a TPMI for uplink precoding (e.g., where the TPMI is within the determined subset). A WTRU may use the received TPMI (e.g., from the indicated subset) to determine a precoder (e.g., for uplink MIMO transmission). A WTRU may transmit uplink data precoded according to the indicated TPMI.

A WTRU may indicate or be indicated a subset or subsets of precoders according to the WTRU's full power capability for full power operation. A WTRU may indicate or be indicated $w_i$ and $w_j$ subsets. A WTRU may indicate or be indicated a precoder structure, for example, where all of its elements are non-zero. A codebook subset for a 2TX non-coherent WTRU may include, for example, some or all of TPMIs={2, 4, 5} for rank=1 (e.g., as defined in Rel-15). Table 4 shows an example of a precoding matrix, which may be associated with NR, for single-layer transmission using four antenna ports with transform precoding enabled. In examples (e.g., for a 4TX non-coherent WTRU with DFT OFDM waveform), precoding options (e.g., to support full power for different WTRU PA architectures and capabilities) may include some or all of the listed TPMIs in each set, e.g., TPMI_set1={4, 6, 7}, TPMI_set2={8, 10, 11}, and TPMI_set3={13, 15, 16, 17, 24, 27}, where each set is intended for a different precoder structures (e.g., PA structure). For example, a Capability 3 WTRU may operate with TPMI_set1 and/or TPMI_set3. A Capability 3 WTRU may operate with TPMI_set2 and/or TPMI_set3. Whether to use TPMI_set1 or TPMI_set2 may be determined, for example, according to a location of full/high-rated PAs. For example, full/high-rated PAs may be used (e.g., only used) on a subset of TX RF chains. A TPMI subset associated with a TX RF chain equipped with a high-rated PA (e.g., full-rated PA) may be selected for operation. A Capability 2 WTRU may operate (e.g., only operate) with TPMI_set3. In examples (e.g., for a 4TX partial-coherent WTRU with DFT OFDM waveform, which may be similar to a non-coherent WTRU case), precoding options may include some or all of the options in TPMI={13, 15, 16, 17, 24, 27} to support full power capability. In examples (e.g., for rank 1 transmission), a 4TX WTRU (e.g., according to its full power capability and PA structure) may indicate or be indicated any of the TPMI_set1, TPMI_set2, and TPMI_set3, or a subset thereof, for full power operation.

TABLE 4

NR Precoding matrix W for single-layer transmission using four antenna ports with transform precoding enabled

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

In examples, a WTRU may be configured with a subset (e.g., one subset) of precoders with antenna selection capability (e.g., with a precoder subset having a structure of $w_i$ or $w_j$). The configured precoder may serve as an implicit SRS resource indicator (SRI), for example, to select the SRS resources with two ports from the configured SRS resource set. A WTRU may combine (e.g., virtualize) ports (e.g., in a gNB transparent manner) to adapt to the configured codebook structure, for example according to the PA rating.

Figure 6:
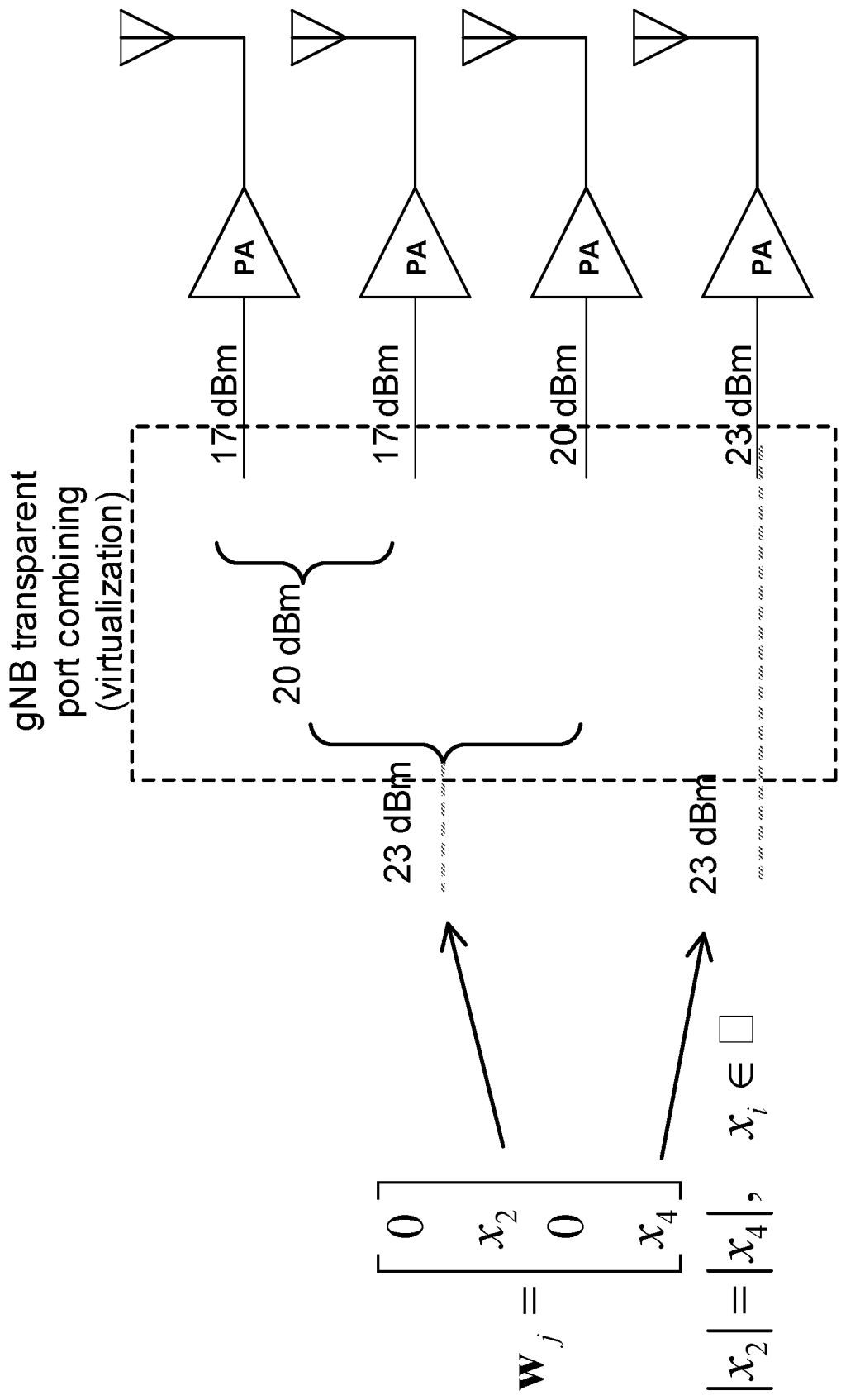
FIG. 6 shows an example virtualization that may be used to adapt to a precoder structure.

FIG. 6 shows an example virtualization that may be used to adapt to a precoder structure. A WTRU may perform a virtualization (e.g., as shown in FIG. 6) to adapt to a $w_j$ structure, for example (e.g., assuming a WTRU with an architecture similar to Option 3 of Table 3 and a configured subset $w_j$).

A Cap3 WTRU may indicate its support for full power transmission, for example, using (e.g., different) subsets of a precoder codebook.

Figure 7:
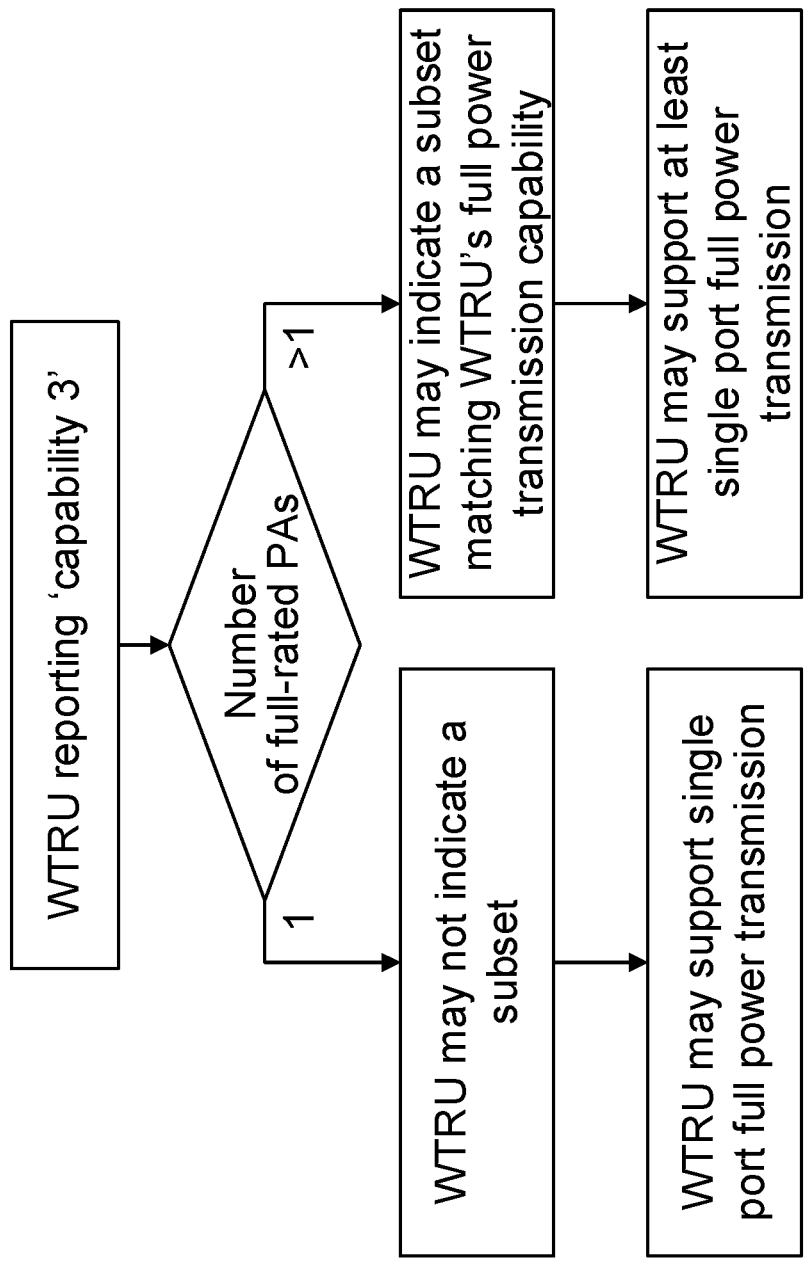
FIG. 7 shows an example implementation for a WTRU indication.

FIG. 7 shows an example implementation associated with a WTRU subset indication. A WTRU may report capability 3. A decision may be made based on the number of full-rated PAs in a WTRU.

A WTRU may not indicate a (e.g., any) subset, for example, if a WTRU reporting 'capability 3' is equipped with a one full rated PA. The WTRU may be configured for single port (e.g., full power) transmission. For example, a WTRU with configuration Option 1 (e.g., as shown by example in Table 3) may not indicate a subset, as its full power transmission may be limited to single port transmission.

A WTRU may indicate its full power transmission support, for example, by indicating a subset of precoders that match the WTRU's full power transmission capability support, such as when a WTRU reporting 'capability 3' is equipped with more than one full rated PA. For example, a WTRU with 4 TX antenna ports may indicate a $w_i$ or $w_j$ subset of precoders. The $w_i$ and $w_j$ subsets may be defined, for example, as shown in FIGS. 4B and 4C, respectively. In examples, (e.g., from the codebook defined in Table 1), precoding options $w_j$ may be limited to (e.g., only) precoders with TPMI indices 8-11. A WTRU may (e.g., based on the indicated subset) be configured for at least single port full power transmission.

A WTRU may be configured (e.g., by the network) to support full power transmission in Mode 1 or Mode 2. A WTRU may be configured (e.g., in Mode 2) with one or more sounding reference signal (SRS) resources with a different number of SRS ports within an SRS resource set (e.g., whose usage may be set to 'codebook').

A WTRU may be indicated (e.g., notified or instructed) to transmit an SRS using a configuration (e.g., one configuration at a time) without antenna virtualization. A WTRU may use single and/or multiport transmission. A WTRU may (e.g., for a transmission) scale power assigned per port according to a PA capability (e.g., each PA capability). For example, the overall transmit power may be linearly divided according to the maximum power rating of a (e.g., each) PA. In an example, a full rated PA may be assigned twice the power of other PAs. A transmission may be performed without precoding. A WTRU may, for example, not use antenna-selection precoders (e.g., in case of transmission of a precoded SRS). A WTRU may receive an SRI, for example, following an SRS transmission. A WTRU may (e.g., based on an indicated SRI) determine the codebook subset for full power transmission and/or whether a single or two ports precoder subset may be used (e.g., based on nrofSRS-Ports parameter in SRS-Config).

In examples, a WTRU may indicate whether the WTRU's PA architecture supports full power over single or two ports (e.g., using the codebook shown in Table 1). Indicated information may be part of WTRU capability signaling and/or may be indicated separately by a WTRU. A WTRU may (e.g., according to an indication) assume (e.g., further assume) the codebook subset for transmission, where the subsets may be pre-configured or pre-defined, e.g., by the specifications. A WTRU may select power scaling, for example, according to the reported number of supported ports. For example, a WTRU may be configured with (e.g., different) codebook subsets that may be defined for support of full power over single or two ports. A WTRU may use the corresponding pre-configured codebook subset, for example, based on the WTRU's indication of support of full power transmission over single or two ports.

In examples (e.g., in Mode 1), the selection of a codebook subset may depend on WTRU capability (e.g., Capability 2 and/or 3). A subset may be defined by inclusion of one or more TPMIs (e.g., TPMIs 12-27 shown in Table 1), for example, for Capability 2. A codebook subset selection (e.g., for Capability 3) may be determined, for example, based on whether full power transmission is supported over one or two ports. In examples (e.g., where full power transmission is supported over one port), a subset codebook may include one or more of the following:

$$\begin{bmatrix} 1 \\ 1 \\ 0 \\ 1 \end{bmatrix}, \begin{bmatrix} 1 \\ -1 \\ 0 \\ 1 \end{bmatrix}, \begin{bmatrix} -1 \\ 1 \\ 0 \\ 1 \end{bmatrix}, \begin{bmatrix} -1 \\ -1 \\ 0 \\ 1 \end{bmatrix}, \begin{bmatrix} 1 \\ j \\ 0 \\ 1 \end{bmatrix}, \begin{bmatrix} 1 \\ -j \\ 0 \\ 1 \end{bmatrix}, \begin{bmatrix} -1 \\ j \\ 0 \\ 1 \end{bmatrix}, \begin{bmatrix} -1 \\ -j \\ 0 \\ 1 \end{bmatrix}, \begin{bmatrix} 1 \\ 1 \\ 0 \\ j \end{bmatrix}$$

$$\begin{bmatrix} 1 \\ -1 \\ 0 \\ j \end{bmatrix}, \begin{bmatrix} -1 \\ 1 \\ 0 \\ j \end{bmatrix}, \begin{bmatrix} -1 \\ -1 \\ 0 \\ j \end{bmatrix}, \begin{bmatrix} 1 \\ j \\ 0 \\ j \end{bmatrix}, \begin{bmatrix} 1 \\ -j \\ 0 \\ j \end{bmatrix}, \begin{bmatrix} -1 \\ j \\ 0 \\ j \end{bmatrix}, \begin{bmatrix} -1 \\ -j \\ 0 \\ j \end{bmatrix}$$

In the example, it may be assumed that a row (e.g., the fourth row) of a column (e.g., each column) maps on the branch with the full power capability (e.g., without considering the location of the full rated PA). One or more choices may be considered. For example the following may be considered:

$$\begin{bmatrix} 0 \\ x_1 \\ x_2 \\ x_3 \end{bmatrix}, \begin{bmatrix} x_1 \\ 0 \\ x_2 \\ x_3 \end{bmatrix}, \begin{bmatrix} x_1 \\ x_2 \\ 0 \\ x_3 \end{bmatrix}, \begin{bmatrix} x_1 \\ x_2 \\ x_3 \\ 0 \end{bmatrix}$$

In examples, $|x_1|=|x_2|=|x_3|=1$. A WTRU may indicate whether its PA architecture supports full power over one or two ports. The indicated information may be part of initial WTRU capability signaling (e.g., Capability 3-1 or Capability 3-2) and/or the information may be indicated separately by a WTRU.

A WTRU may signal a Mode 2 capability and/or may operate in Mode 2. Whether an SRS resource can support full power transmission may depend, for example, on a number of SRS ports and/or an RF PA structure in a WTRU. Table 5 shows an example of support for full power transmission based on PA architecture and/or the number of SRS ports in an SRS resource, e.g., for a PC3 WTRU:

TABLE 5

Exemplary full power support cases per different WTRU Capabilities (PC3)

| Option | PA1 (dBm) | PA2 (dBm) | PA3 (dBm) | PA4 (dBm) | SRS Resources supporting full power |
|---|---|---|---|---|---|
| 1 (WTRU Cap 2) | 17 | 17 | 17 | 17 | 1 port (with virtualization) 2 ports (with virtualization) 4 ports |
| 2 (WTRU Cap 2) | 17 | 17 | 17 | 20 | 1 port (with virtualization) 2 ports (with virtualization) 4 ports |
| 3 (WTRU Cap 2) | 17 | 17 | 20 | 20 | 1 port (with virtualization) 2 ports (with and without virtualization) 3 ports (with virtualization) 4 ports |
| 4 (WTRU Cap 3) | 17 | 17 | 17 | 23 | 1 port (with and without virtualization) 2 ports (with virtualization) 4 ports |
| 5 (WTRU Cap 3) | 17 | 17 | 20 | 23 | 1 port (with and without virtualization) 2 ports (with and without virtualization) 3 ports (with virtualization) 4 ports |
| 6 (WTRU Cap 3) | 17 | 17 | 23 | 23 | 1 port, with and without virtualization 2 ports, with and without virtualization 3 ports, with virtualization 4 ports |
| 7 (WTRU Cap 3) | 17 | 20 | 20 | 23 | 1 port, with and without virtualization 2 ports, with and without virtualization 3 ports, with and without virtualization 4 ports |
| 8 (WTRU Cap 3) | 20 | 20 | 23 | 23 | 1 port, with and without virtualization 2 ports, with and without virtualization 3 ports, with and without virtualization 4 ports |
| 9 (WTRU Cap 3) | 17 | 23 | 23 | 23 | 1 port, with and without virtualization 2 ports, with and without virtualization 3 ports, with and without virtualization 4 ports |

As shown in Table 5, for one or more cases (e.g., each case), full power transmission for an (e.g., each) SRS resource port configuration may be supported with and/or without virtualization, which may be transparent to a gNB. An SRS resource may be configured with different numbers of ports. Full power may or may not be met with one or more (e.g., all) port sizes. WTRUs may have different PA architectures, and/or may have limited support for the number of virtualization cases. A WTRU may use a per SRS resource for full power transmission support (e.g., regardless of the PA structure of a PC3 WTRU). A WTRU may provide an indication for a range of SRS resources (e.g., a specific range) and/or for cases of SRS ports. The range of interest of SRS resources may be a configured parameter. A WTRU may use a bitmap, for example, to indicate full power support. In examples, the state of each bit may be an indication for an individual SRS resource and/or port size. For example (e.g., for a 4 TX WTRU), a bitmap $b_1b_2b_3b_4=1101$ may indicate full power capability for one or more (e.g., any) SRS resources (e.g., with 1, 2, or 4 SRS ports), while a bitmap $b_1b_2b_3b_4=1111$ may indicate full power support for one or more (e.g., any) sizes of SRS ports.

A WTRU may indicate whether the WTRU supports full power for 3 ports SRS resource configuration. In examples, full power transmission by 1, 2, and 4 port SRS may be supported by all options. As shown in Table 5, full power transmission may be supported in the options, excluding options 1 and 4 in Table 5). An indication mechanism may indicate whether full power transmission with a 3 port SRS configuration is supported.

Figure 8:
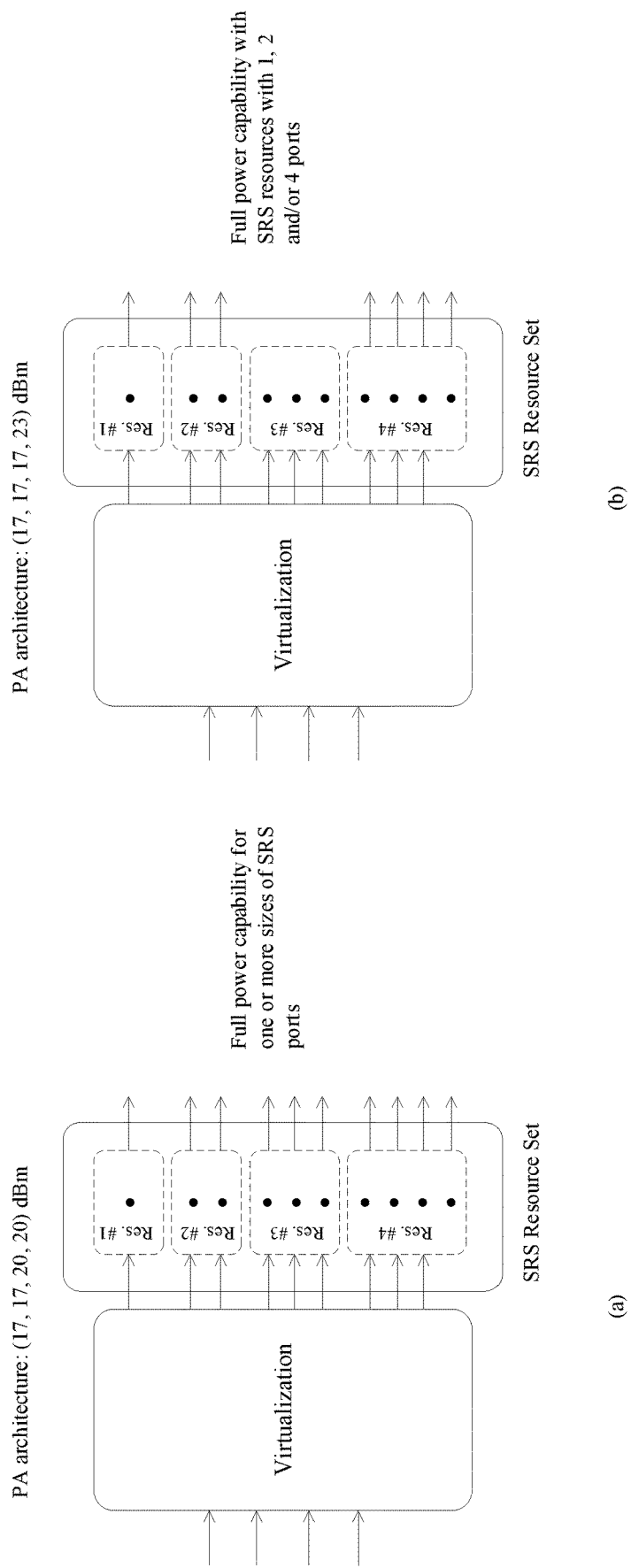
FIG. 8 shows an example of full power transmission capability for two exemplary PA architectures and numbers of SRS ports.

FIG. 8 shows an example of full power transmission capability for two exemplary PA architectures and numbers of SRS ports. In examples (e.g., as shown in FIG. 8(a)), full power capability for one or more (e.g., all) sizes of SRS ports may be supported. In examples (e.g., as shown in FIG. 8(b)), full power capability (e.g., only) with SRS resources with 1, 2, and/or 4 ports may be supported.

In examples (e.g., in NR, for 4 TX WTRUs configured in Mode 2), a maximum number of SRS resources (e.g., 4 SRS resources) may be configured with usage set to 'codebook' in a set. A resource (e.g., each resource) may be configured with a different number of SRS ports. A WTRU configured in Mode 2 may receive a configuration, for example, where one or more SRS resources (e.g., each SRS resource) in a set may be associated with a different virtualization, e.g., to support full power transmission. A WTRU may receive an SRS configuration according to the WTRU's full power transmission capability for a case (e.g., each case) of a number of potential SRS ports A gNB may not be aware of WTRU PA architectures. A gNB may not presume all SRS port configurations support full power transmission. A WTRU may receive an SRS configuration, for example, after indicating the WTRU's full power support capability per SRS port size. In examples, a WTRU may use the bitmap $b_1b_2b_3b_4=1110$, for example, to indicate that full power support may be realized (e.g., only) for SRS port sizes of 1, 2 and 3. In examples, a WTRU may assume that the WTRU will not receive an SRS configuration with a size of 4 ports and/or will not receive an SRI corresponding to a 4 port configuration.

A 4 TX WTRU may receive an SRS configuration, for example, based on whether full power by a 3 port SRS transmission is supported. A WTRU may indicate its full power transmission capability, for example, by indicating an SRI corresponding to one or more (e.g., each) SRS resource supporting full power transmission (e.g., if the WTRU is configured with an SRS resource set). A WTRU may indicate a full power transmission capability, for example, with a bit map. A bit (e.g., each bit) may correspond to a configured SRS resource and/or an SRI. A WTRU may indicate a full power transmission capability of an SRS resource represented by an SRI, for example, using a (e.g., a single) bit (e.g., if an SRS resource with three ports is configured).

A WTRU may use an indication, for example, to signal whether an indicated SRS port is based on virtualization of coherent RF TX chains. For example, a WTRU may use a first bitmap $b_1b_2b_3b_4=1101$ to indicate full power support by 1, 2 and/or 4 SRS port configurations. The WTRU may use a second bit map $d_1d_2d_3d_4=0100$ to indicate that (e.g., only) an SRS configuration with 2 ports is based on virtualization of coherent RF TX chains, e.g., where the 1 port SRS configuration may be based on virtualization of coherent ports. An indication of 4 port coherency may not be used for a 4 TX WTRU, for example, when 4 port coherency may be determined based on a general coherency capability of the WTRU. The length of a bitmap may be reduced (e.g., by one bit) to $d_1d_2d_3$, for example, for a 4 TX WTRU.

Figure 9:
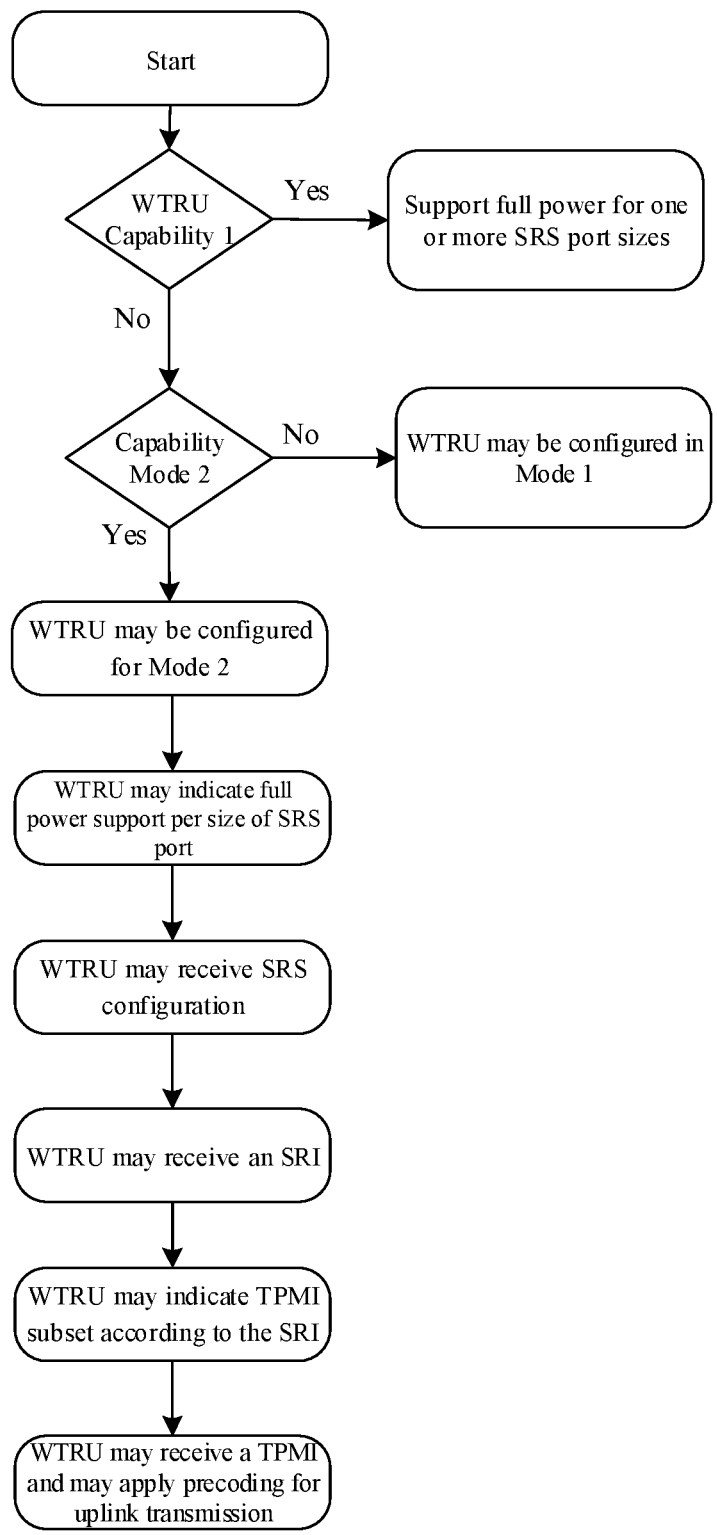
FIG. 9 shows an example of WTRU capability signaling and operation for full power transmission in Mode 2.

FIG. 9 shows an example of WTRU capability signaling and operation for full power transmission in Mode 2. Various implementations of the example shown in FIG. 9 may include one or more of the following operations. A WTRU may indicate whether the WTRU is a Capability 1 WTRU. If the WTRU is a Capability 1 WTRU, the WTRU may support full power transmission for one or more (e.g., all) SRS port sizes, and may receive an SRS configuration with a combination (e.g., any combination) of number of ports. If the WTRU is not a Capability 1 WTRU, the WTRU may indicate whether the WTRU supports Mode 2. If the WTRU does not support Mode 2, the WTRU may be configured in Mode 1. If the WTRU supports Mode 2, the WTRU may receive a configuration for operating in Mode 2. The WTRU may indicate whether the WTRU can support full power transmission, for example using a bitmap, where the bitmap may correspond to a (e.g., specific) range of a number of SRS ports. In examples, a bit may indicate full power capability for (e.g., only) 3 ports, and/or 4 bits may indicate full power capability for one or more (e.g., all) potential cases of 1 to 4 ports. The WTRU may receive an SRS configuration, for example, according to the WTRU's reported support of full power capability per SRS ports. The WTRU may receive an SRI, e.g., corresponding to the transmission rank. The WTRU may indicate the TPMI subset according to the received SRI. The WTRU may receive a TPMI and apply precoding for uplink transmission.

A Capability 1 WTRU may be configured to operate in Mode 2 (e.g., as described herein), for example, due to differences in coherence capability pairing of TX chains in WTRUs.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:
a processor configured to:
determine, from a set of transmit precoding matrix indicators (TPMIs), a subset of TPMIs based on full power uplink transmission support associated with the WTRU, wherein the subset of TPMIs comprises a first TPMI, and wherein the first TPMI supports full power transmission;
transmit, to a network device, an indication of the determined subset of TPMIs, wherein the indication indicates that the subset of TPMIs supports full power transmission;
receive, from the network device, an indication that indicates full power configuration information, wherein the full power configuration information indicates to the WTRU to operate with full power transmission;
receive, from the network device, an indication that indicates the first TPMI; and
transmit, to the network device, uplink data precoded with a precoding matrix indicated by the first TPMI.

2. The WTRU of claim 1, wherein the indication of the determined subset of TPMIs comprises an index that identifies the subset of TPMIs.

3. The WTRU of claim 1, wherein the set of TPMIs comprises a plurality of subsets of TPMIs.

4. The WTRU of claim 3, wherein each of the plurality of subsets of TPMIs is associated with a respective precoder structure.

5. The WTRU of claim 1, wherein the processor is further configured to determine, based on the first TPMI, a precoder for precoding the uplink data.

6. The WTRU of claim 1, wherein the processor is further configured to transmit a first indication that indicates a full power uplink transmission capability associated with the WTRU.

7. The WTRU of claim 6, wherein the full power uplink transmission capability associated with the WTRU is WTRU capability 3.

8. A method associated with a wireless transmit/receive unit (WTRU), the method comprising:
determining, from a set of transmit precoding matrix indicators (TPMIs), a subset of TPMIs based on full power uplink transmission support associated with the WTRU, wherein the subset of TPMIs comprises a first TPMI, and wherein the first TPMI supports full power transmission;
transmitting, to a network device, an indication of the determined subset of TPMIs, wherein the indication indicates that the subset of TPMIs supports full power transmission;

receiving, from the network device, an indication that indicates full power configuration information, wherein the full power configuration information indicates to the WTRU to operate with full power transmission;

receiving, from the network device, an indication that indicates the first TPMI; and transmitting, to the network device, uplink data precoded with a precoding matrix indicated by the first TPMI.

9. The method of claim 8, wherein the indication of the determined subset of TPMIs comprises an index that identifies the subset of TPMIs.

10. The method of claim 8, wherein the set of TPMIs comprises a plurality of subsets of TPMIs.

11. The method of claim 10, wherein each of the plurality of subsets of TPMIs is associated with a respective precoder structure.

12. The method of claim 8, further comprising determining, based on the first TPMI, a precoder for precoding the uplink data.

13. The method of claim 8, further comprising transmitting a first indication that indicates a full power uplink transmission capability associated with the WTRU.

14. The method of claim 13, wherein the full power uplink transmission capability associated with the WTRU is WTRU capability 3.

* * * * *